US012369222B2

(12) United States Patent
Wang et al.

(10) Patent No.: US 12,369,222 B2
(45) Date of Patent: Jul. 22, 2025

(54) DISCONTINUOUS RECEPTION ALIGNMENT GROUPING FOR SIDELINK AND CELLULAR COMMUNICATION

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 571 days.

(21) Appl. No.: 17/649,317

(22) Filed: Jan. 28, 2022

(65) Prior Publication Data

US 2023/0247717 A1 Aug. 3, 2023

(51) Int. Cl.
*H04W 76/28* (2018.01)
*H04W 56/00* (2009.01)
*H04W 92/18* (2009.01)

(52) U.S. Cl.
CPC ......... *H04W 76/28* (2018.02); *H04W 56/001* (2013.01); *H04W 92/18* (2013.01)

(58) Field of Classification Search
CPC ... H04W 76/28; H04W 56/001; H04W 92/18; H04W 76/14
See application file for complete search history.

(56) References Cited

U.S. PATENT DOCUMENTS

2022/0232665 A1* 7/2022 Back ................ H04W 76/28

FOREIGN PATENT DOCUMENTS

WO WO-2022013446 A2 * 1/2022 ............ H04W 24/02
WO WO-2022154413 A1 * 7/2022 ........ H04W 36/0033

OTHER PUBLICATIONS

Ericsson: "General Aspects for SL DRX", R2-2100536, 3rd Generation Partnership Project, Mobile Competence Centre, 650, Route Des Lucioles, F-06921 Sophia-Antipolis Cedex, France, vol. RAN WG2, No. e-Meeting, Jan. 25, 2021-Feb. 5, 2021, Jan. 14, 2021, 6 Pages, XP051972686, Section 2.3.
International Search Report and Written Opinion—PCT/US2022/054190—ISA/EPO—Apr. 28, 2023.

* cited by examiner

*Primary Examiner* — Ayanah S George
(74) *Attorney, Agent, or Firm* — Loza & Loza, LLP

(57) ABSTRACT

Aspects relate to aligning discontinuous reception (DRX) timing associated with sidelink communication. In some examples, a DRX alignment group may be indicated for a user equipment (UE) for the purposes of aligning the DRX timing of a sidelink connection with the DRX timing of at least one other connection (e.g., a base station connection and/or another sidelink connection). In some examples, a base station may signal to the UE an indication of at least one DRX alignment group for the UE.

29 Claims, 22 Drawing Sheets

DISCONTINUOUS RECEPTION ALIGNMENT GROUPING FOR SIDELINK AND CELLULAR COMMUNICATION

TECHNICAL FIELD

The technology discussed below relates generally to wireless communication and, more particularly, to alignment groups for aligning discontinuous reception (DRX) timing for a user equipment for sidelink communication and cellular communication.

INTRODUCTION

Wireless communication between devices may be facilitated by various network configurations. In one configuration, a cellular network may enable wireless communication devices to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first user equipment may include a transceiver, and a processor coupled to the transceiver. The processor may be configured to receive via the transceiver an indication of at least one discontinuous reception alignment group associated with sidelink communication. The processor may also be configured to receive via the transceiver a first data transmission during a period of time associated with a first discontinuous reception alignment group of the at least one discontinuous reception alignment group.

In some examples, a method for wireless communication at a first user equipment is disclosed. The method may include receiving an indication of at least one discontinuous reception alignment group associated with sidelink communication. The method may also include receiving a first data transmission during a period of time associated with a first discontinuous reception alignment group of the at least one discontinuous reception alignment group.

In some examples, a first user equipment may include means for receiving an indication of at least one discontinuous reception alignment group associated with sidelink communication. The first user equipment may also include means for receiving a first data transmission during a period of time associated with a first discontinuous reception alignment group of the at least one discontinuous reception alignment group.

In some examples, a non-transitory computer-readable medium has stored therein instructions executable by one or more processors of a first user equipment to receive an indication of at least one discontinuous reception alignment group associated with sidelink communication. The computer-readable medium may also have stored therein instructions executable by one or more processors of the first user equipment to receive a first data transmission during a period of time associated with a first discontinuous reception alignment group of the at least one discontinuous reception alignment group.

In some examples, a first base station may include a transceiver, and a processor coupled to the transceiver. The processor may be configured to transmit via the transceiver an indication of at least one discontinuous reception alignment group associated with sidelink communication. The processor may also be configured to transmit via the transceiver a first data transmission during a period of time associated with a first discontinuous reception alignment group of the at least one discontinuous reception alignment group.

In some examples, a method for wireless communication at a first base station is disclosed. The method may include transmitting an indication of at least one discontinuous reception alignment group associated with sidelink communication. The method may also include transmitting a first data transmission during a period of time associated with a first discontinuous reception alignment group of the at least one discontinuous reception alignment group.

In some examples, a first base station may include means for transmitting an indication of at least one discontinuous reception alignment group associated with sidelink communication. The first base station may also include means for transmitting a first data transmission during a period of time associated with a first discontinuous reception alignment group of the at least one discontinuous reception alignment group.

In some examples, a non-transitory computer-readable medium has stored therein instructions executable by one or more processors of a first base station to transmit an indication of at least one discontinuous reception alignment group associated with sidelink communication. The computer-readable medium may also have stored therein instructions executable by one or more processors of the first base station to transmit a first data transmission during a period of time associated with a first discontinuous reception alignment group of the at least one discontinuous reception alignment group.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
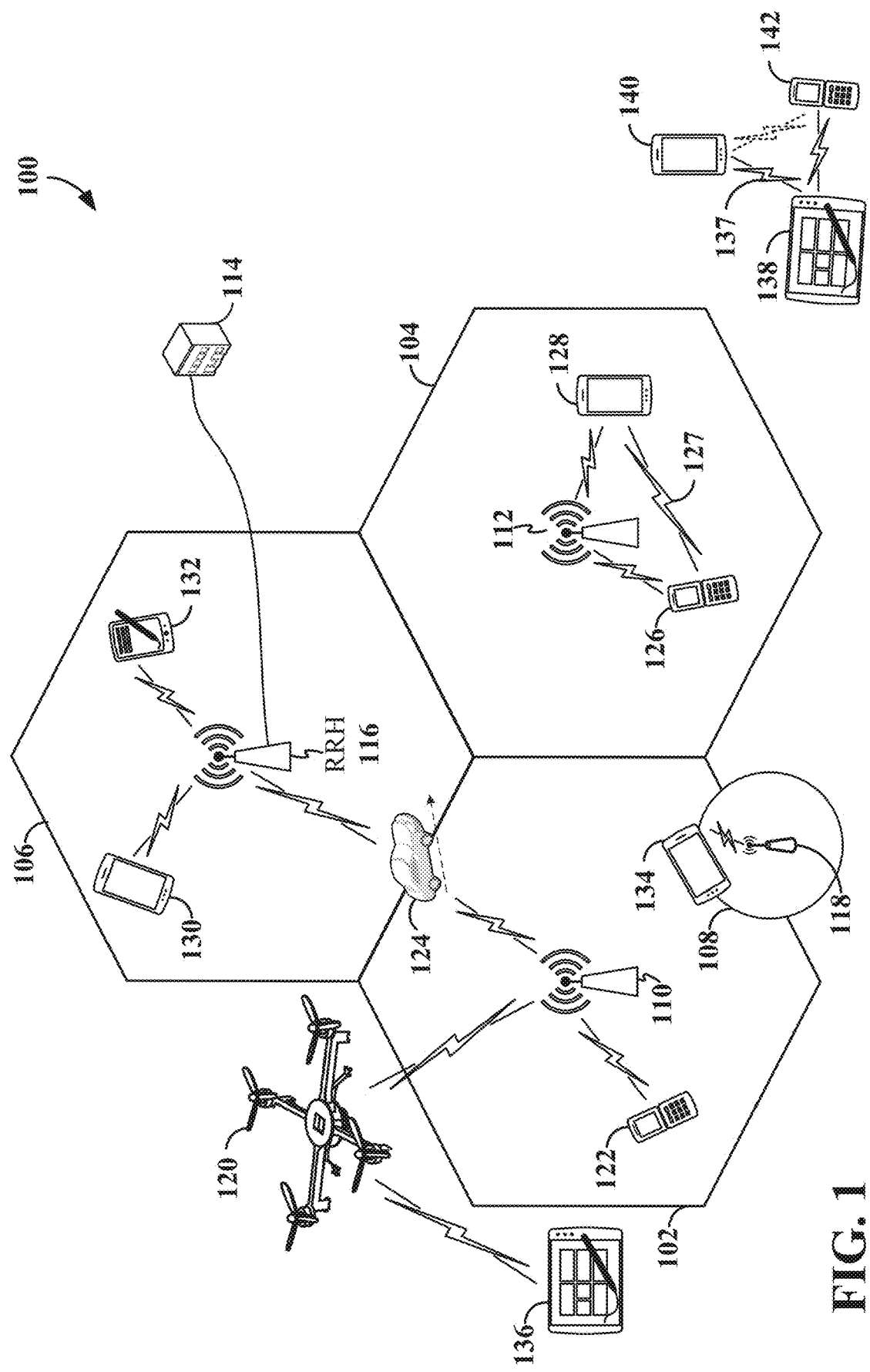
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The disclosure relates in some aspects to aligning discontinuous reception (DRX) timing associated with sidelink communication. In addition, the disclosure relates in some aspects to different DRX alignment groups associated with sidelink communication.

In some examples, a first user equipment (UE) may have a first base station connection (e.g., a first cellular connection over a first Uu link) to a first base station (BS) and a first sidelink connection to a second UE. In addition, the second UE may have a second base station connection (e.g., a second cellular connection over a second Uu link) to a second BS. Furthermore, a third UE may have a third base station connection (e.g., a third cellular connection over a third Uu link) to a third BS and a second sidelink connection to a fourth UE.

The first UE, the second UE, the third UE, and the fourth UE may be assigned to the same or different DRX alignment groups for the purposes of aligning DRX timing for a sidelink connection to the DRX timing for a base station connection and/or DRX timing for another sidelink connection. For example, the first UE and the second UE may be assigned to a first DRX alignment group, and the third UE and the fourth UE may be assigned to a second DRX alignment group. Here, the first DRX alignment group may be associated with a different DRX cycle configuration (e.g., timing offset) than the second DRX alignment group.

In some examples, a base station may signal to a UE an indication of a DRX alignment group that the UE is to use. For example, the base station or some other network entity (e.g., a central base station) may select a particular DRX alignment group for the UE based on one or more factors (e.g., sidelink connectivity, a sidelink mode, quality of service requirements, the status of the DRX alignment groups, and so on). The base station may then send a message to the UE specifying that the UE is to use the selected DRX alignment group.

In some examples, a UE may identify the DRX alignment group that the UE is to use. For example, the UE may be configured with a list of DRX alignment groups. In this case, the UE may identify one of the DRX alignment groups based on a defined criterion (e.g., a UE identifier).

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as Long Term Evolution (LTE). The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station (e.g., the UAV 120). Here, each base station 110, 112, 114, 118, and the UAV 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelink signaling 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on Institute of Electrical and Electronics Engineers (IEEE) 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
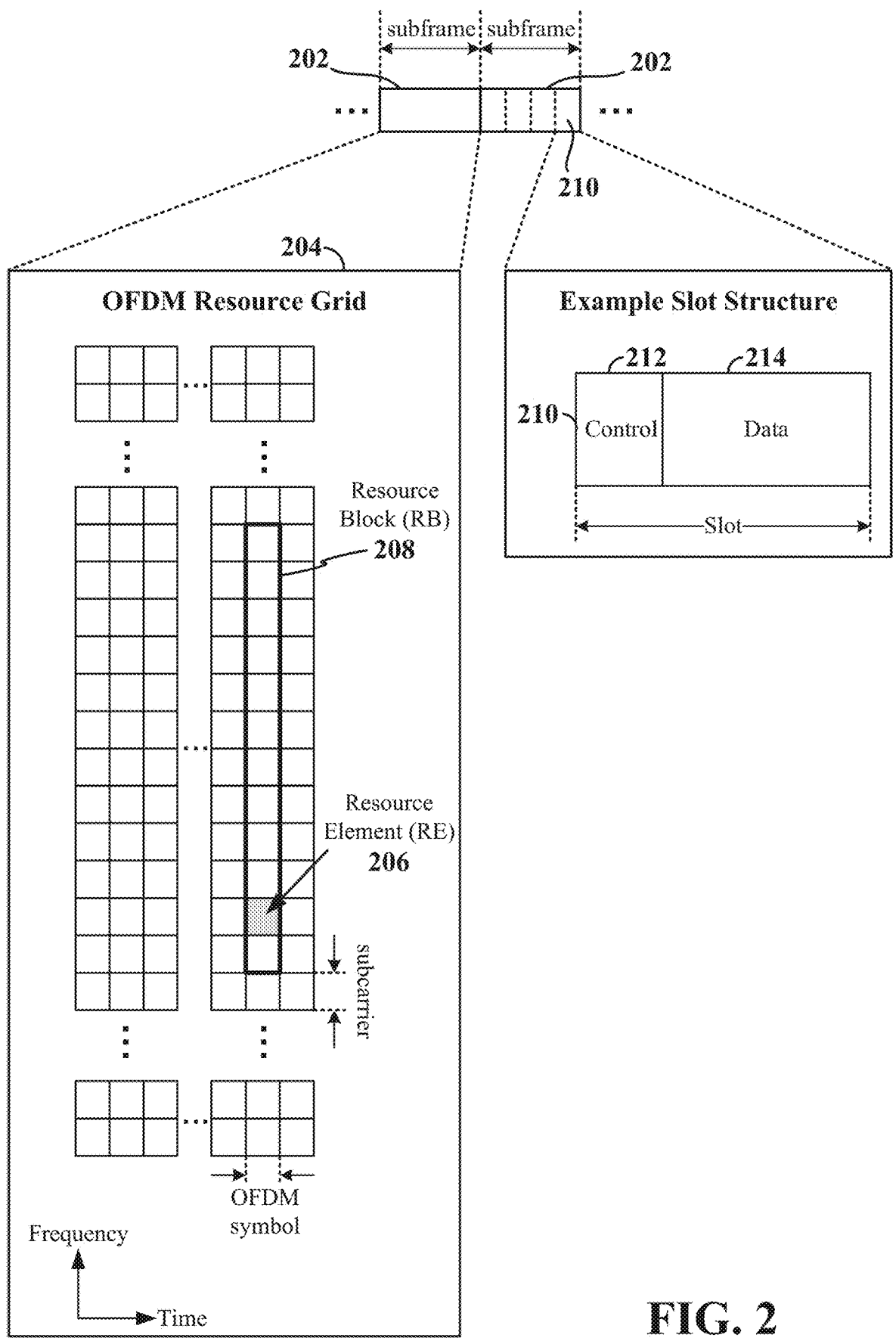
FIG. 2 is a schematic diagram illustrating organization of wireless resources in an air interface utilizing orthogonal frequency divisional multiplexing (OFDM) according to some aspects.

Referring now to FIG. 2, an expanded view of an exemplary subframe 202 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSB s may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESETO), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a proximity service (ProSe) PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
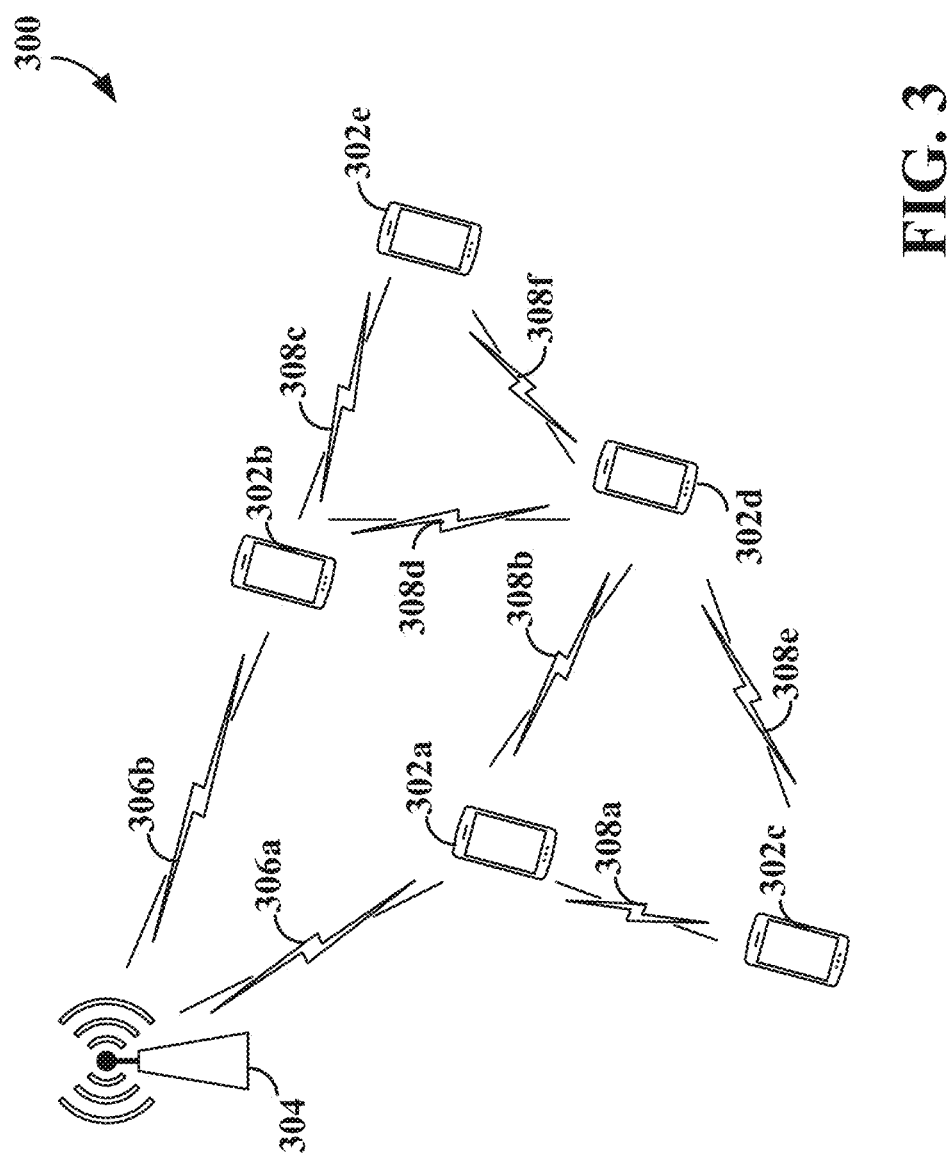
FIG. 3 is a diagram illustrating an example of a wireless communication network supporting cellular communication and sidelink communication according to some aspects.

FIG. 3 is a diagram illustrating an exemplary wireless communication network 300 employing D2D or sidelink relaying. The wireless communication network 300 may correspond, for example, to the RAN 100 illustrated in FIG. 1. The wireless communication network 300 may include a network entity 304 (e.g., a base station, eNB, or gNB) in wireless communication with one or more wireless communication devices (e.g., a UE 302a, a UE 302b, a UE 302c, a UE 302d, and a UE 302e). In the example shown in FIG. 3, the network entity 304 may communicate with at least the UE 302a and the UE 302b via respective Uu wireless communication links 306a and 306b. In some examples, the network entity 304 may further have a Uu link with one or more remote UEs (e.g., the UEs 302c, 302d, and/or 302e). Each of the Uu wireless communication links 306a and 306b may utilize a sub-6 GHz carrier frequency or a mmWave carrier frequency. In some examples, one or more UEs (e.g., the UEs 302c, 302d, and 302e) may not have a Uu connection with the network entity 304. In some examples, the network entity 304 may correspond to any of the base stations or scheduling entities shown in any of FIGS. 1, 7, 8, 12, 15, and 20. In some examples, the UEs 302a-302e may correspond to any of the UEs or scheduled entities shown in any of FIGS. 1, 7, 8, 12, 15, and 17.

In addition, respective D2D relay links 308a-308f (e.g., sidelinks) may be established between various UEs to enable relaying of information between the network entity 304 and one or more remote UEs, such as the UEs 302c-302e, or between a remote UE (e.g., the UE 302e) and a destination UE (e.g., the UE 302c). For example, the relay link 308a may be established between the UE 302c and the UE 302a, the relay link 308b may be established between the UE 302d and the UE 302a, the relay link 308c may be established between the UE 302e and the UE 302b, the relay link 308d may be established between the UE 302d and the UE 302b, the relay link 308e may be established between the UE 302c and the UE 302d, and the relay link 308f may be established between the UE 302d and the UE 302e. Each relay link 308a-308f may utilize, for example, decode and forward (DF) relaying, amplify and forward (AF) relaying, or compress and forward (CF) relaying. For DF relaying, HARQ feedback may be provided from the receiving device to the transmitting device. The sidelink communication over the relay links 308a-308d may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

The relay links 308a-308f may be established due to, for example, distance or signal blocking between the network entity 304 (or destination UE) and a remote UE (e.g., the UE 302e), weak receiving capability of the remote UE, low transmission power of the remote UE, limited battery capacity of the remote UE, and/or to improve link diversity. Thus, the relay links 308a-308f may enable communication between the network entity 304 and a remote UE (e.g., the UE 302e) to be relayed via one or more relay UEs (e.g., the UEs 302a-302d) over the Uu wireless communication links 306a and 306b and the relay links 308a-308f. In other examples, the relay links 308a-308f may enable sidelink communication to be relayed between a remote UE 302e and another destination UE (e.g., the UE 302c) over various relay links.

In some examples, the relay links 308a-308f may utilize a ProSe PC5 interface for sidelink communication between the UEs 302a-302e. To facilitate D2D sidelink communication between, for example, the UEs 302a and 302c over a sidelink (e.g., the relay link 308a), the UEs 302a and 302c may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink (e.g., the relay link 308a). For example, the discovery signal may be utilized by the UE 302c to measure the signal strength and channel status of a potential sidelink (e.g., the relay link 308a) with another UE (e.g., the UE 302a). The UE 302c may utilize the measurement results to select a UE (e.g., the UE 302a) for sidelink communication or relay communication.

In some examples, a common carrier may be shared between the relay links 308a-308f and the Uu wireless communication links 306a and 306b, such that resources on the common carrier may be allocated for both sidelink communication between the UEs 302a-302e and cellular communication (e.g., uplink and downlink communication) between the UEs 302a-302e and the network entity 304. In addition, in a 5G NR sidelink deployment, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either preconfigured (e.g., a factory setting on the UE determined, for example, by sidelink standards or specifications) or configured by a base station (e.g., the network entity 304).

In addition, there may be two main resource allocation modes of operation for sidelink (e.g., PC5) communication. In a first mode, Mode 1, the network entity 304 (e.g., a gNB) may allocate resources to sidelink devices (e.g., the UEs 302a-302e) for sidelink communication between the UEs 302a-302e in various manners. For example, the network entity 304 may allocate sidelink resources dynamically (e.g., a dynamic grant) to the UEs 302a-302e, in response to requests for sidelink resources from the UEs 302a-302e. The network entity 304 may further activate preconfigured sidelink grants (e.g., configured grants) for sidelink communication among the UEs 302a-302e. In Mode 1, sidelink feedback (sidelink HARQ feedback) may be reported back to the network entity 304. For example, the UE 302a may transmit sidelink HARQ feedback received from the UE 302c to the network entity 304.

In a second mode, Mode 2, the UEs 302a-302e may autonomously select sidelink resources for sidelink communication therebetween. In some examples, a transmitting UE (e.g., the UE 302a) may perform resource/channel sensing to select resources (e.g., sub-channels) on the sidelink channel that are unoccupied. Signaling on the sidelink is the same between the two modes. Therefore, from a receiver's point of view, there is no difference between the modes.

A remote UE (e.g., the UE 302d) may generally connect to a source relay UE (e.g., the UE 302a) via a layer 3 (L3) connection with no Uu connection with (and no visibility to) the network or via a layer 2 (L2) connection where the remote UE supports Uu access stratum (AS) and non-AS (NAS) connections with the network. When there is no direct connection path (Uu connection) between the remote UE and the network entity (e.g., an L3 connection), the remote UE is connected to the relay UE via a PC5 connection only (e.g., Layer 3 UE-to-NW). In this example, the relay UE may report to the 5G core network (5GC) about the remote UE's presence. In other examples, the remote UE may be visible to the 5GC via a non-3GPP interworking function (N3IWF) as discussed below.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. SCI-1 may also include information about SCI-2. For example, SCI-1 may disclose the format of SCI-2. In some examples, the format may indicate the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for a NACK. SCI-2 may include other information that is useful for establishing and decoding a PSSCH resource.

Figure 4A:
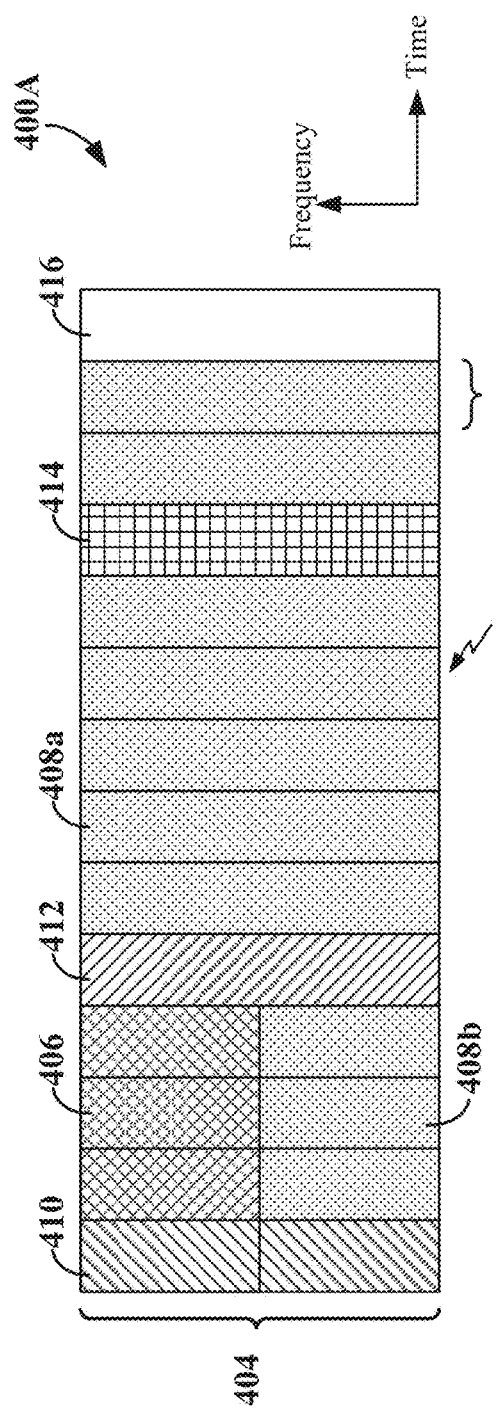
FIG. 4A is a conceptual diagram illustrating an example of a sidelink slot structure according to some aspects.
Figure 4B:
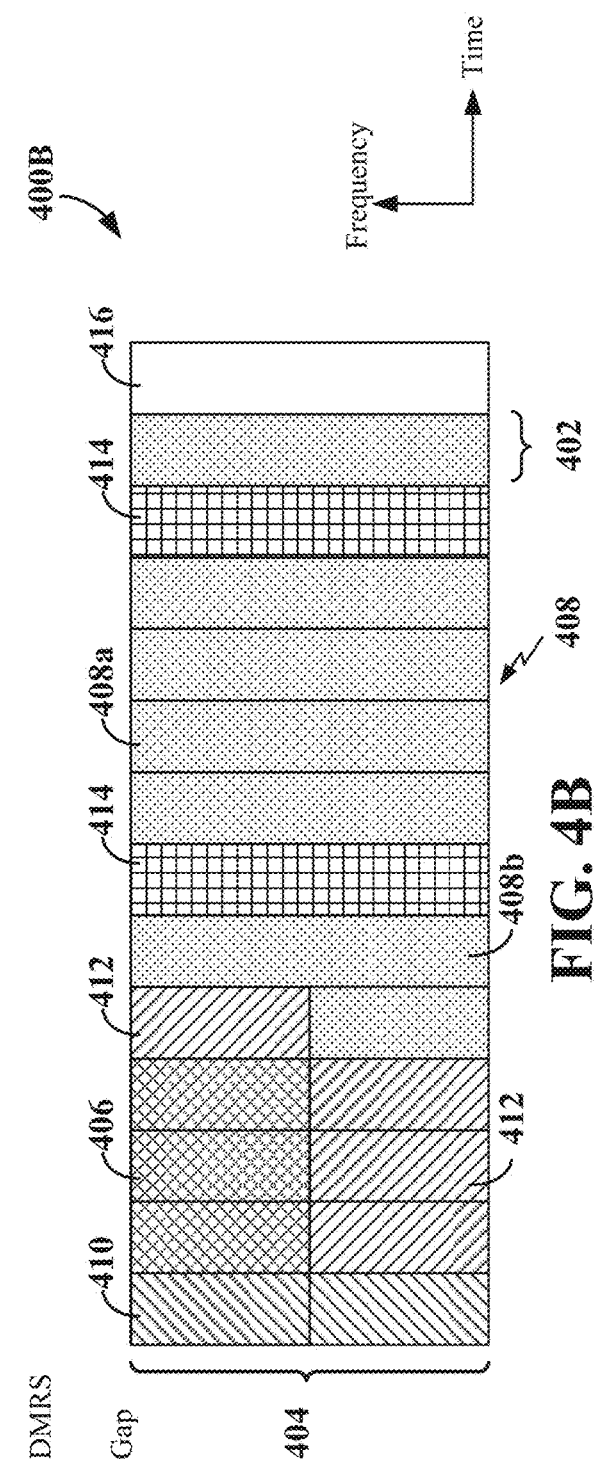
FIG. 4B is a conceptual diagram illustrating another example of a sidelink slot structure according to some aspects.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 14, 20, 24, 40, 44, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region of the slot 400a and 400b. Each sidelink slot 400a and 400b includes a physical sidelink shared channel (PSSCH) 408 occupying a data region of each slot 400a and 400b. The PSCCH 406 and the PSSCH 408 are each transmitted on one or more symbols 402 of each slot 400a and 400b. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400a or 400b. In other examples, the PSCCH 406 may schedule a PSSCH (not shown) in a subsequent slot.

In some examples, the duration of the PSCCH 406 is configured to be two or three symbols. In addition, the PSCCH 406 may be configured to span a configurable number of PRBs, limited to a single sub-channel. For example, the PSCCH 406 may span 10, 12, 14, 20, or 24 PRBs of a single sub-channel. A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400a or 400b and the PSCCH 406 spans three symbols.

The PSSCH 408 may be time-division multiplexed (TDMed) with the PSCCH 406 and/or frequency-division multiplexed (FDMed) with the PSCCH 406. In the example shown in FIG. 4A, a first portion 408a of the PSSCH 408 is TDMed with the PSCCH 406 and a second portion 408b of the PSSCH 408 is FDMed with the PSCCH 406. In the example shown in FIG. 4B, the PSSCH 408 is TDMed with the PSCCH 406.

One and two layer transmissions of the PSSCH 408 may be supported with various modulation orders. For example, the PSSCH 408 may be modulated using quadrature phase-shift keying (QPSK), or quadrature amplitude modulation (QAM) such as 16-QAM, 64-QAM and 246-QAM.

The PSSCH 408 may include DMRSs 414 configured in a two, three, or four symbol DMRS pattern. In some examples, the slot 400a shown in FIG. 4A includes a two symbol DMRS pattern. In some examples, the slot 400b shown in FIG. 4B includes a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 (PSSCH DMRS) 412 is mapped to RBs within the fifth symbol. In the example shown in FIG. 4B, the first symbol containing a PSSCH DMRS is the second symbol, which also includes the PSCCH 406. In addition, the SCI-2 (PSSCH DMRS) 412 are shown spanning symbols two through five. Thus, in this example, the SCI-2 (PSSCH DMRS) 412 is FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the second portion 408b of the PSSCH 408 may be transmitted on both the first symbol and the second symbol. In the example shown in FIG. 4B, the second symbol containing the PSCCH 406 FDMed with the SCI-2 (PSSCH DMRS) 412 may be transmitted on both the first symbol and the second symbol.

A UE under the coverage area of a RAN may operate in one of several defined operating states (also referred to as modes). In some examples, these states include an idle state, an inactive state, and a connected state. In 5G NR, these operating states may be defined as radio resource control (RRC) states: RRC_IDLE, RRC_INACTIVE, and RRC_CONNECTED.

Figure 5:
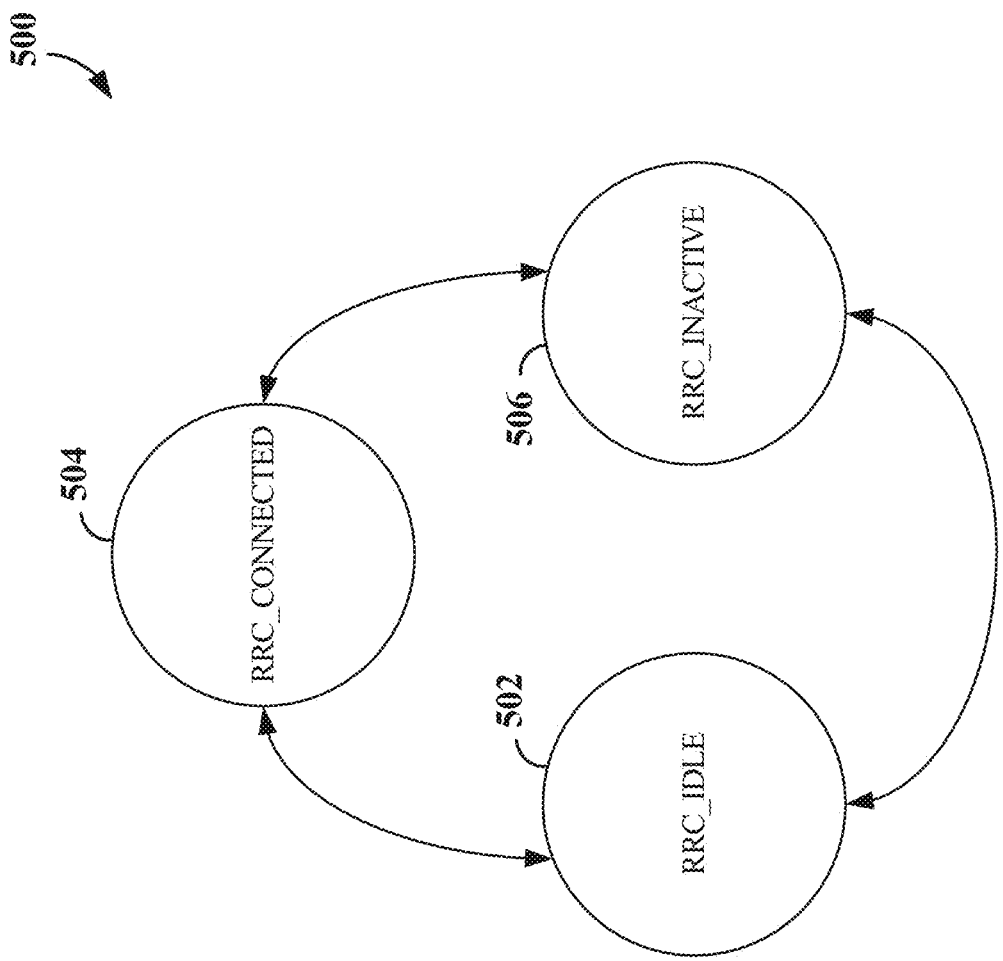
FIG. 5 is a conceptual illustration of an example of communication state transitions according to some aspects.

FIG. 5 illustrates an example of a state transition diagram 500 for these operating states. A UE will be in an idle state (e.g., RRC_IDLE 502) when it first powers up. The UE may transition to a connected state (e.g., RRC_CONNECTED 504) with a RAN (e.g., with a base station of the RAN) by performing a random access procedure with that RAN. In the connected state, the UE may communicate with the RAN via dedicated signaling (e.g., dedicated channels). A UE may switch to idle state or inactive state (e.g., RRC_INACTIVE 506) under certain circumstances. For example, a UE that does not have data to send to the RAN and that is not receiving data from the RAN may elect to switch to the idle state or the inactive state to conserve battery power. In these states, since the UE is not actively communicating with the RAN, the UE may power off some of its components (e.g., radio components). That is, the UE enters a lower power state.

The UE will periodically wake up from the low power state to monitor for signaling from the RAN (e.g., to determine whether the RAN has data to send to the UE). In some examples, this periodicity may be based on a discontinuous reception (DRX) cycle specified by the RAN.

Figure 6:
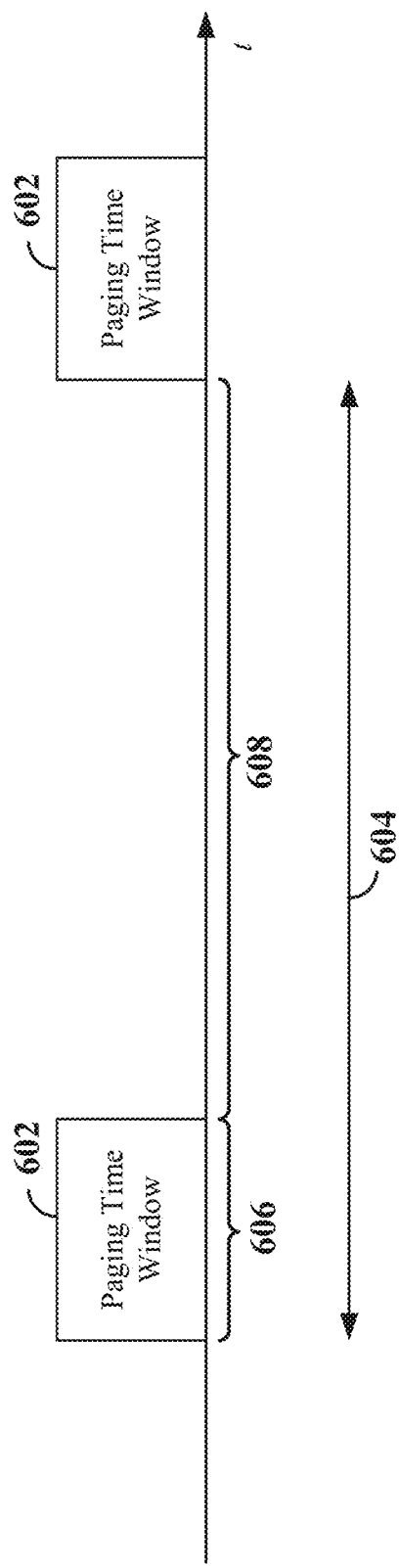
FIG. 6 is a conceptual illustration of an example of a discontinuous reception (DRX) cycle according to some aspects.

FIG. 6 illustrates an example 600 of such a DRX cycle where paging time windows 602 are separated in time according to a DRX cycle period 604. In this example, each paging time window 602 corresponds to a time period 606 during which time the UE wakes up from the lower power state to receive paging messages from the RAN (e.g., from a base station of the RAN). If the RAN has data to send to the UE or if the RAN needs to communicate with the UE for other reasons, the RAN will page the UE according to the DRX cycle (i.e., during the paging time windows 602 when the UE periodically wakes up from the lower power state). The RAN sends a paging message via a paging channel (e.g., via a paging frame). In addition, the RAN may define different paging opportunities that can be used by different UEs to receive a paging message. That is, UEs remain in the lower power state (e.g., during the time period 608) until their own paging opportunities occur. The use of different paging opportunities for different UEs allows the RAN to direct paging to a particular UE or a small subset of UEs. This reduces the likelihood that a UE will need to expend battery power to process paging that is directed to another UE. Upon receiving a paging message indicating that the network will be sending data (or other information) that a UE needs to receive, the UE may resume full operations (e.g., turn on all radio components) and, if needed, reestablish a connected state with the RAN.

Figure 7:
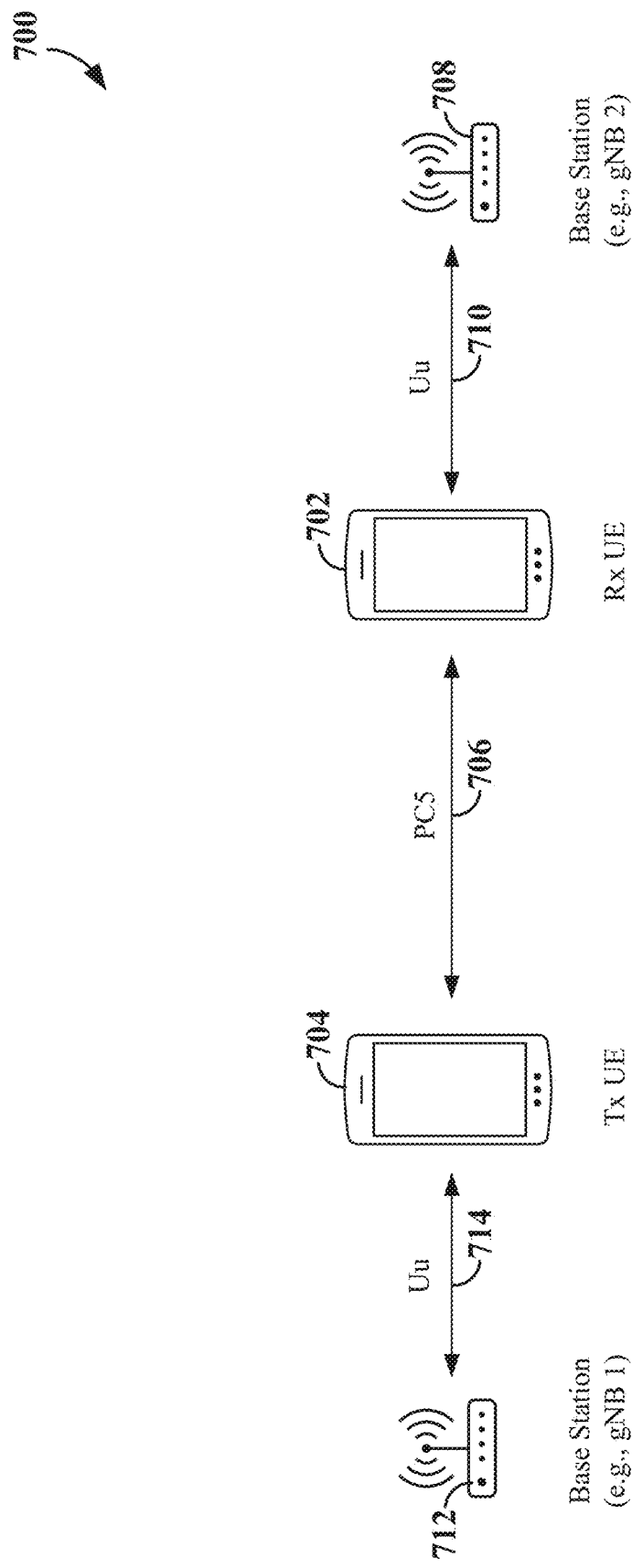
FIG. 7 is a diagram illustrating an example of cellular communication links and a sidelink communication link according to some aspects.

As discussed above in conjunction with FIG. 3, in some scenarios, UEs that are connected to different base stations may communicate directly with one another via a sidelink. FIG. 7 illustrates a diagram 700 of such a scenario, where a first UE 702 communicates with a second UE 704 via a PC5 link 706 for sidelink communication. The first UE 702 also communicates with a first base station 708 (e.g., a gNB) via a first Uu link 710. In addition, the second UE 704 communicates with a second base station 712 (e.g., a gNB) via a second Uu link 714. In some examples, the first base station 708 and the second base station 712 may correspond to any of the base stations or scheduling entities shown in any of FIGS. 1, 3, 8, 12, 15, and 20. In some examples, the first UE 702 and the second UE 704 may correspond to any of the UEs or scheduled entities shown in any of FIGS. 1, 3, 8, 12, 15, and 17.

At some point in time, the second UE 704 may be configured to transmit data to the first UE 702 via the PC5 link 706. The second UE 704 may be referred to as a transmit (Tx) UE and the first UE 702 may be referred to a receive (Rx) UE in this scenario. In addition, the DRX for a PC5 link such as the PC5 link 705 may be referred to as sidelink (SL) DRX and the DRX for a Uu link such as the first Uu link 710 may be referred to as Uu DRX.

To save battery power, the first UE 702 may elect to use DRX for the PC5 link. To this end, the SL DRX for the first UE 702 (SL Rx UE) may be time aligned with the Uu DRX for the second UE 704 (SL Tx UE). This enables data to be efficiently sent from the second base station 712 to the first UE 702, for example, since the second UE 704 may wake up (according to its Uu DRX cycle) to receive a transmission from the second base station 712 concurrently with the first UE 702 waking up (according to its SL DRX cycle) to receive a transmission from the second UE 704.

Figure 8:
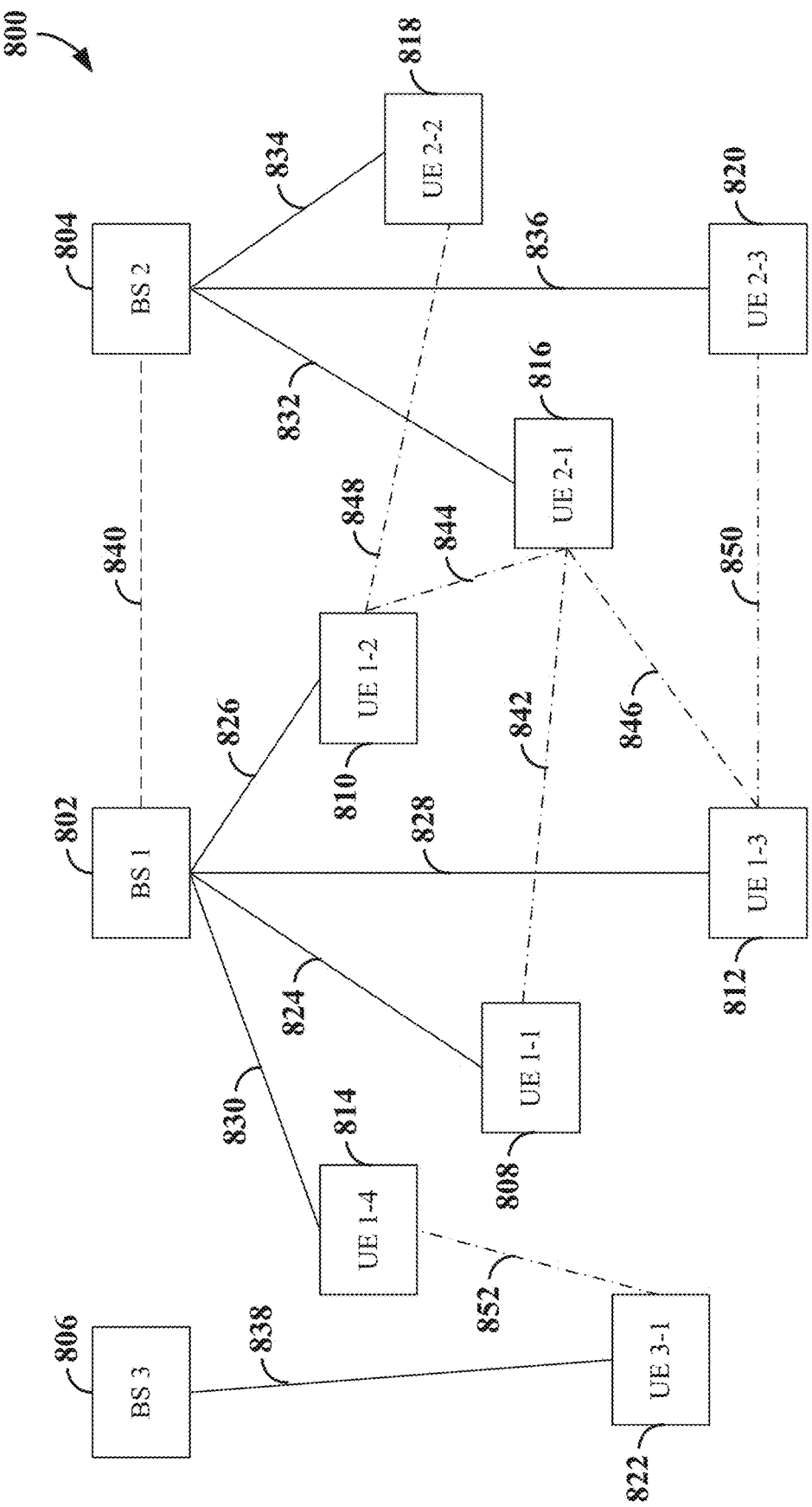
FIG. 8 is a diagram illustrating another example of cellular communication links and a sidelink communication link according to some aspects.

DRX timing alignment may also be employed in a wireless communication system where multiple sidelinks are established between different sets of UEs. FIG. 8 illustrates an example of a wireless communication system 800 that includes a first base station (BS 1) 802, a second BS (BS 2) 804, a third BS (BS 3) 806, a first UE (UE 1-1) 808, a second UE (UE 1-2) 810, a third UE (UE 1-3) 812, a fourth UE (UE 1-4) 814, a fifth UE (UE 2-1) 816, a sixth UE (UE 2-2) 818, a seventh UE (UE 2-3) 820, and an eighth UE (3-1) 822. In some examples, the first base station (BS 1) 802, the second BS (BS 2) 804, and the third BS (BS 3) 806 may correspond to any of the base stations or scheduling entities shown in any of FIGS. 1, 3, 7, 12, 15, and 20. In some examples, the first UE (UE 1-1) 808, the second UE (UE 1-2) 810, the third UE (UE 1-3) 812, the fourth UE (UE 1-4) 814, the fifth UE (UE 2-1) 816, the sixth UE (UE 2-2) 818, the seventh UE (UE 2-3) 820, and the eighth UE (3-1) 822 may correspond to any of the UEs or scheduled entities shown in any of FIGS. 1, 3, 7, 12, 15, and 17.

In FIG. 8, the UE i-j is the jth UE connected to BS i. The first BS 802 communicates with the first UE (UE 1-1) 808, the second UE (UE 1-2) 810, the third UE (UE 1-3) 812, and the fourth UE (UE 1-4) 814 via a first Uu link 824, a second Uu link 826, a third Uu link 828, and a fourth Uu link 830, respectively. The second BS 804 communicates with the fifth UE (UE 2-1) 816, the sixth UE (UE 2-2) 818, and the seventh UE (UE 2-2) 820 via a fifth Uu link 832, a sixth Uu link 834, and a seventh Uu link 836, respectively. The third BS 806 communicates with the eighth UE (UE 3-1) 822 via an eighth Uu link 838. In addition, the first BS 802 may communicate with the second BS 804 via an appropriate link (e.g., an X2 link or an Xn link).

A given UE may connect to one or more UEs via a sidelink. In the example of FIG. 8, the first UE (UE 1-1) 808 communicates with the fifth UE (UE 2-1) 816 via a first sidelink 842. In addition, the fifth UE (UE 2-1) 816 communicates with the second UE (UE 1-2) 810 via a second sidelink 844 and with the third UE (UE 1-3) 812 via a third sidelink 846. The second UE (UE 1-2) 810 communicates with the sixth UE (UE 2-2) 818 via a fourth sidelink 848. The third UE (UE 1-3) 812 communicates with the seventh UE (UE 2-3) 820 via a fifth sidelink 850. The fourth UE (UE 1-4) 814 communicates with the eighth UE (UE 3-1) 822 via a sixth sidelink 852. Here, a UE may act as a Tx UE, a Rx UE, or both.

If two UEs are linked by a path on a sidelink, the UEs may be considered to be within the same connected component. For example, the first UE (UE 1-1) 808, the second UE (UE 1-2) 810, the third UE (UE 1-3) 812, the fifth UE (UE 2-1) 816, the sixth UE (UE 2-2) 818, and the seventh UE (UE 2-2) 820 may be deemed as being within in a first connected component. In addition, the fourth UE (UE 1-4) 814 and the eighth UE (UE 3-1) 822 may be deemed as being within a second connected component.

Some of the UEs of a connected component may not have a direct sidelink connection. For example, the first UE (UE 1-1) 808 and the sixth UE (UE 2-2) 818 do not have a direct sidelink connection. However, there is a communication path between these UEs via the first UE (UE 1-1) 808, the fifth UE (UE 2-1) 816, the second UE (UE 1-2) 810, and the sixth UE (UE 2-2) 818.

In some examples, DRX alignment may be specified for all UEs within a connected component. For example, if UE A is aligned with UE B, and UE B is aligned with UE C, then UE A is also aligned with UE C.

In some examples, DRX alignment might not be specified for UEs belonging to different connected components. For example, for UEs that do not have a sidelink connection, there may be no need to align their DRX configurations.

DRX alignment may be bi-directional. For example, each UE in a set of UEs may be operating in an RRC_CONNECTED mode. Here, the transmissions between each UE pair may be bi-directional (e.g., each UE can be a Tx UE and a Rx UE). Thus, DRX may be aligned in both directions. For unicast communication, per-direction DRX configuration may be used as a baseline.

In some examples, the following alignment rules may be used in conjunction with aligning Uu DRX and SL DRX. First, alignment of a Uu DRX and an SL DRX for a UE may include full overlapping between the Uu DRX and the SL DRX in time. Second, alignment of a Uu DRX and an SL DRX for a UE may include partial overlapping between the Uu DRX and the SL DRX in time. Third, for at least SL RX-UEs operating in an RRC_CONNECTED mode with a base station, the alignment of a Uu DRX and an SL DRX may be controlled by the base station. Fourth, for the case of Mode 1 scheduling (discussed above), a Uu DRX of the Tx UE and an SL DRX of the Rx UE may be aligned.

One or more of the factors set forth below may be applicable to alignment of Uu DRX and SL DRX for a set of UEs. In some examples, two types of alignment are defined. Type 1 DRX alignment involves alignment of a Tx UE's Uu DRX with a Rx UE's SL DRX. Type 2 DRX alignment involves alignment of a given UE's Uu DRX with that UE's SL DRX.

As discussed above, a UE may operate in mode 1 when transmitting. In some examples, Type 1 DRX alignment may be specified only when a Tx UE works in mode 1. Here, since the UE receives a sidelink grant and data from a base station during its On duration on the Uu link, and may forward this information to the Rx UE, the Rx UE may monitor the channel when the Tx UE starts transmitting. Conversely, if the Tx UE operates in mode 2, the Tx UE may not receive a sidelink grant or data from a base station. Thus, there may be no need to make a Type 1 DRX alignment (to the Uu link) in this case.

Transmissions between a UE pair (UE 1 and UE 2) may be bi-directional. In a first direction (Direction 1), the UE 1 transmits to the UE 2. In this case, the UE 1 is the Tx UE and the UE 2 is the Rx UE. In a second direction (Direction 2), the UE 2 transmits to the UE 1. In this case, the UE 2 is the Tx UE and the UE 1 is the Rx UE.

Alignment may be supported for both of these directions and for both types of DRX alignment for each UE pair. In Direction 1, UE 1 's Uu DRX may be aligned with UE 2's SL DRX, and UE 2's Uu DRX may be aligned with UE 2's SL DRX. In Direction 2, UE 2's Uu DRX may be aligned with UE 1's SL DRX, and UE 1's Uu DRX may be aligned with UE 1's SL DRX. In some examples, two UEs are deemed to be aligned when both types of DRX alignment in both directions are achieved.

In some aspects, DRX alignment among all UEs may involve a tradeoff between latency and resource utilization. If the Uu DRX and SL DRX configurations of UEs are not aligned, communication latency may be higher than desired in situations where a Tx UE that receives a sidelink grant and data during its On duration needs to wait for the Rx UE's next On duration to transmit the data. Also, if the Uu DRX and SL DRX configurations of UEs are not aligned, UE power consumption may be higher than desired in situations where a Tx UE needs to be active outside of its scheduled On durations in order to communicate with an Rx UE that has different On durations than the Tx UE.

If the Uu DRX and SL DRX configurations of all UEs are aligned, latency and power consumption may be reduced. However, wireless communication resources may be wasted in this case.

Figure 9:
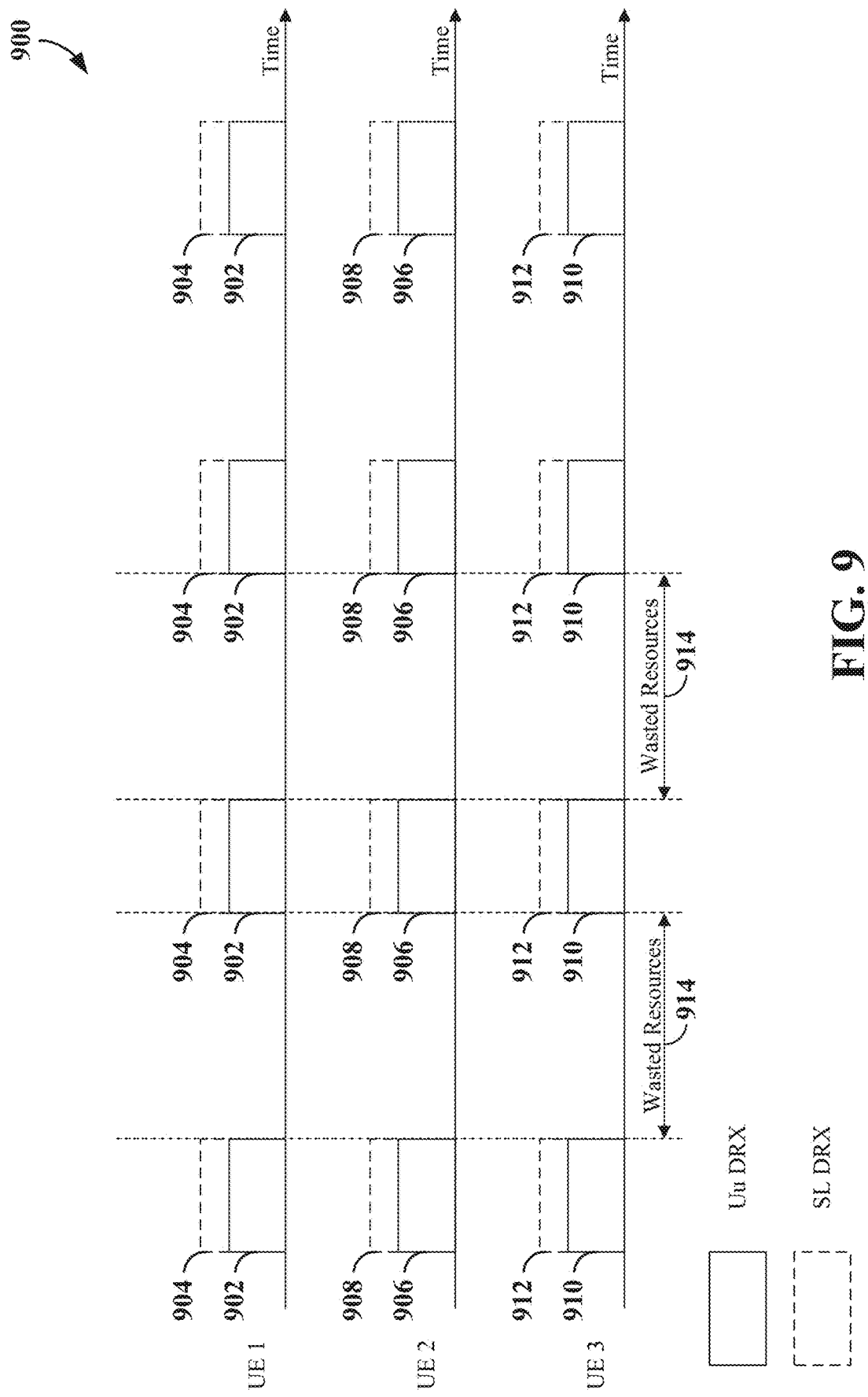
FIG. 9 is a diagram illustrating a first example of aligning sidelink discontinuous reception (DRX) timing with cellular DRX timing according to some aspects.

For example, FIG. 9 illustrates an example of a DRX configuration 900 for a first UE (UE 1), a second UE (UE 2), and a third UE (UE 3). For the first UE (UE 1), the Uu DRX cycle 902 is aligned with the sidelink (SL) DRX cycle 904. Similarly, for the second UE (UE 2) the Uu DRX cycle 906 is aligned with the sidelink (SL) DRX cycle 908 and, for the third UE (UE 3), the Uu DRX cycle 910 is aligned with the sidelink (SL) DRX cycle 912. For purposes of illustration, each SL DRX is shown as being offset in the y direction from the corresponding Uu DRX. This need not be the case in an actual implementation.

As illustrated in FIG. 9, the DRX cycles for the first UE (UE 1), the second UE (UE 2), and the third UE (UE 3) are time aligned. As indicated by the period of time 914, this configuration wastes communication resources (e.g., slots) since none of the UEs use the resources during this period of time.

Conversely, if the Uu DRX and SL DRX configurations of all UEs are not aligned, it is possible that some UEs might never go to sleep. In this case, the power consumption by these UEs may be unacceptably high.

Figure 10:
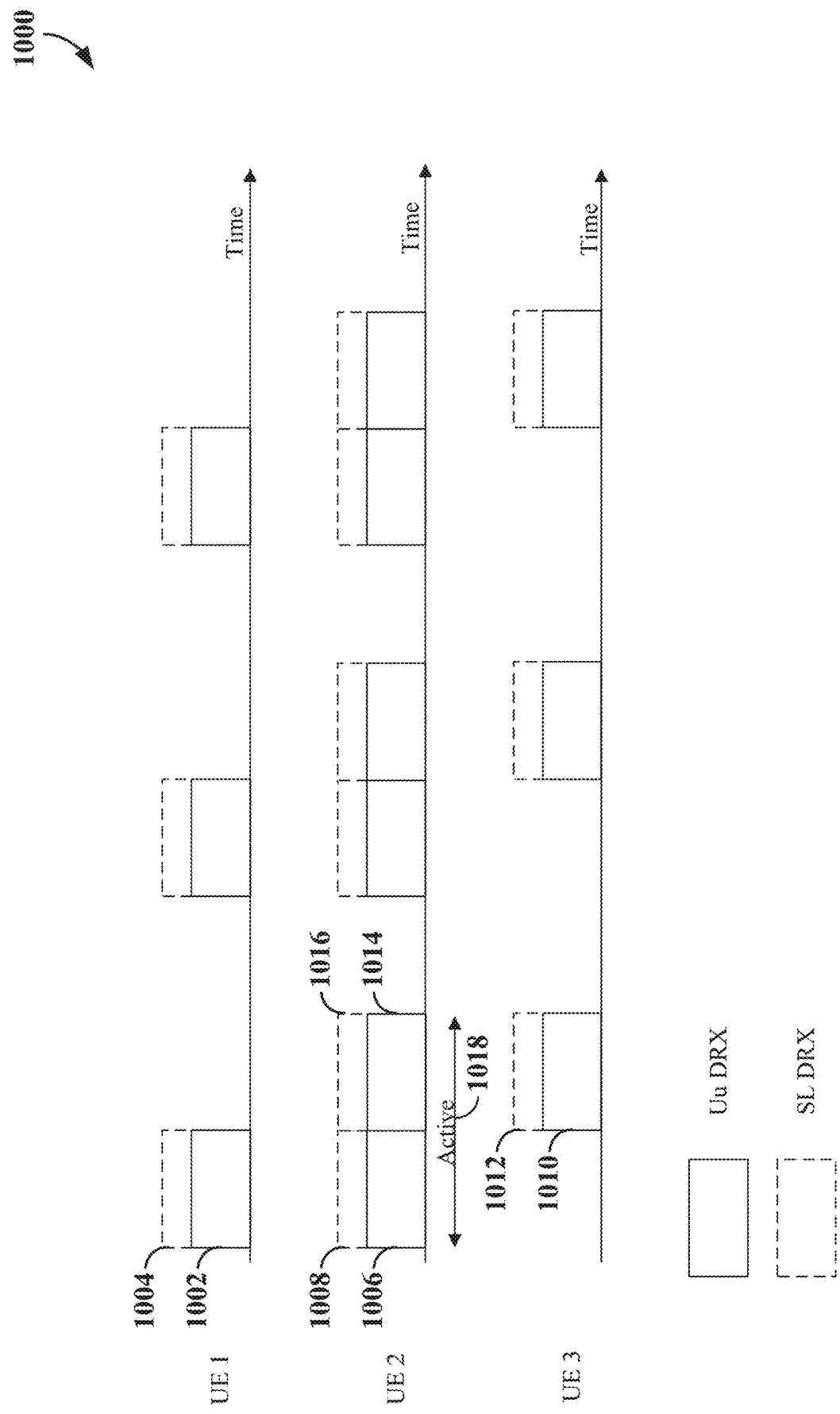
FIG. 10 is a diagram illustrating a second example of aligning sidelink DRX timing with cellular DRX timing according to some aspects.

For example, FIG. 10 illustrates an example of a DRX configuration 1000 for a first UE (UE 1), a second UE (UE 2), and a third UE (UE 3) where some of the DRX configurations are not aligned. For the first UE (UE 1), the Uu DRX cycle 1002 is aligned with the sidelink (SL) DRX cycle 1004. Similarly, for the second UE (UE 2) the Uu DRX cycle 1006 is aligned with the sidelink (SL) DRX cycle 1008. Also, for the third UE (UE 3), the Uu DRX cycle 1010 is aligned with the sidelink (SL) DRX cycle 1012. For purposes of illustration, each SL DRX is shown as being offset in the y direction from the corresponding Uu DRX. This need not be the case in an actual implementation.

In the example of FIG. 10, the DRX cycles for the third UE (UE 3) are not aligned with the DRX cycles for the first UE (UE 1) and the second UE (UE 2). Thus, in the event the second UE (UE 2) has a sidelink connection with both the first UE (UE 1) and the third UE (UE 3), the second UE (UE 2) may elect to extend its DRX to align with both the DRX of the first UE (UE 1) and the DRX of the third UE (UE 3) as indicated by the active period of time 1018. Therefore, the second UE (UE 2) will be in an active state for a longer period of time, resulting in higher power consumption by the second UE (UE 2). However, resource utilization is better in this example (e.g., more slots are used) as compared to the example of FIG. 9.

The disclosure relates in some aspects to optimizing DRX alignment among UEs to improve the resource utilization and latency, while reducing the power consumption of the UEs as well. In some examples, to maintain good resource utilization while reducing latency and power consumption of UEs, DRX alignment may be based on groups. For example, the UEs may be split into multiple groups, where each UE is enrolled in one group. UEs within the same group are DRX aligned, while UEs in different groups are not aligned. A DRX grouping may be associated with a pair of base stations. The grouping may be for all UEs within a connected group. For example, all UEs within a first connected group may have a first DRX alignment while all UEs within a second connected group may have a second DRX alignment. However, UEs in different DRX groups might not be DRX aligned.

Figure 11:
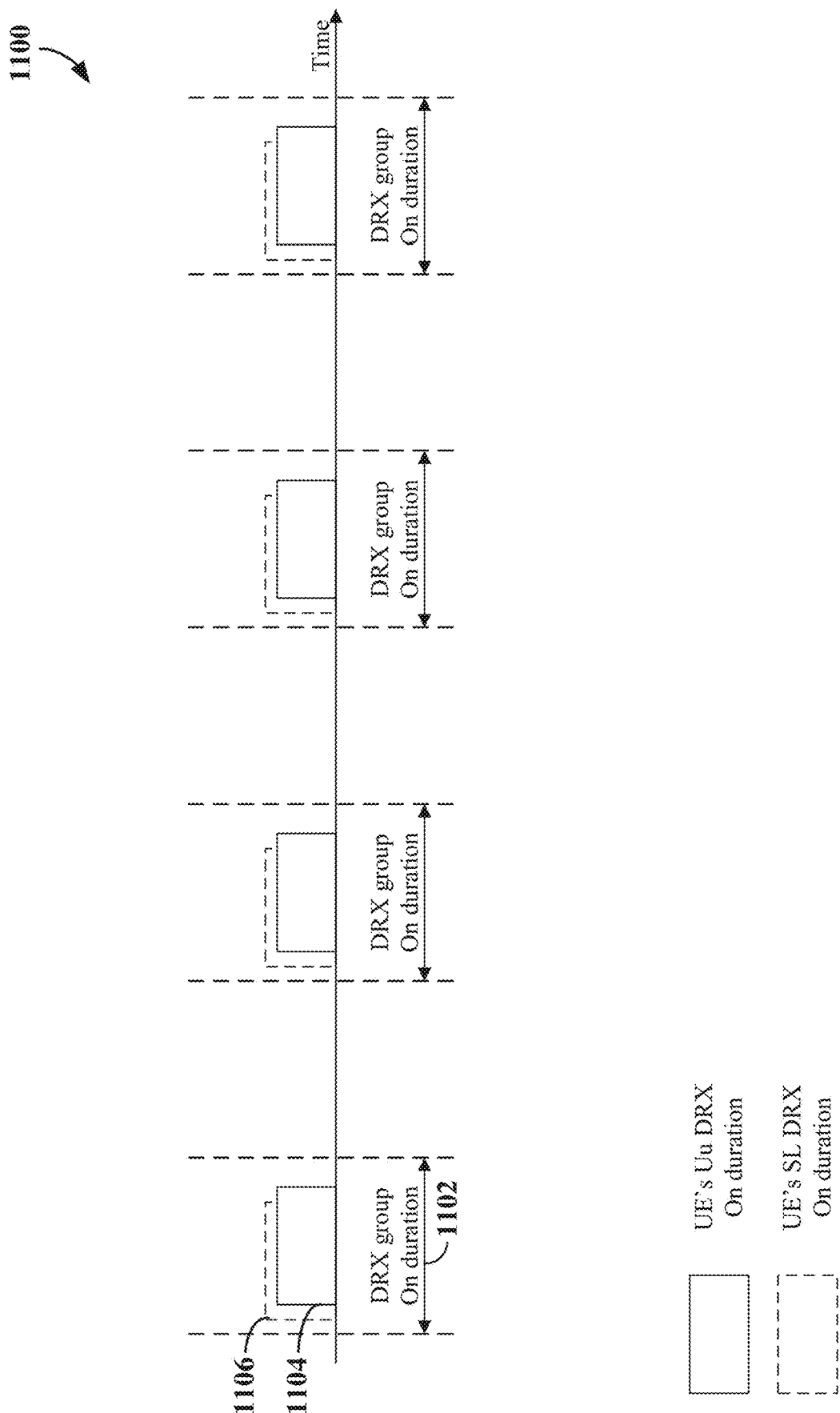
FIG. 11 is a diagram illustrating an example of a DRX On duration according to some aspects.

FIG. 11 illustrates an example of a DRX configuration 1100 for a DRX group including Uu DRX On durations and SL DRX On durations. In some examples, a base station may configure each DRX group to be used by UEs under the base station. The On duration 1102 of different DRX groups may be set to be non-overlapping or partially overlapping. In some examples, the configuration of a DRX group might not be specifically directed to Uu DRX or SL DRX. In some examples, the configuration of a DRX group might not be dedicated to a specific UE. However, a UE's Uu DRX On duration 1104 and SL DRX On duration 1106 may be defined to be within the On duration of the assigned DRX group as shown in the DRX configuration 1100 of FIG. 11.

Figure 12:
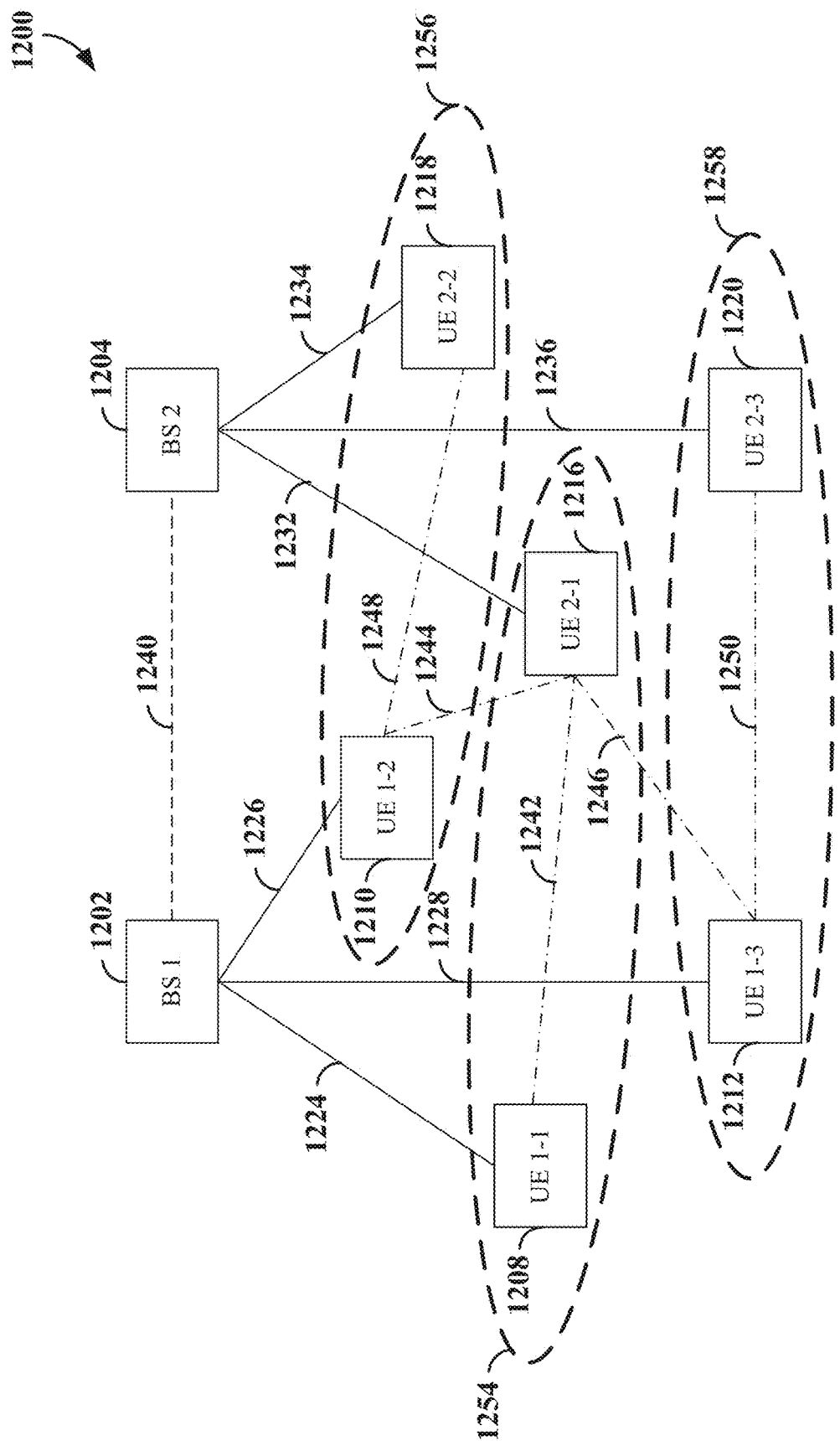
FIG. 12 is a diagram illustrating an example of DRX alignment groups according to some aspects.

FIG. 12 illustrates a wireless communication system 1200 similar to the wireless communication system 800 of FIG. 8. The wireless communication system 1200 includes a first base station (BS 1) 1202, a second BS (BS 2) 1204, a first UE (UE 1-1) 1208, a second UE (UE 1-2) 1210, a third UE (UE 1-3) 1212, a fourth UE (UE 2-1) 1216, a fifth UE (UE 2-2) 1218, and a sixth UE (UE 2-3) 1220. The first BS 1202 communicates with the first UE (UE 1-1) 1208, the second UE (UE 1-2) 1210, and the third UE (UE 1-3) 1212 via a first Uu link 1224, a second Uu link 1226, and a third Uu link 1228, respectively. The second BS 1204 communicates with the fourth UE (UE 2-1) 1216, the fifth UE (UE 2-2) 1218, and the sixth UE (UE 2-2) 1220 via a fourth Uu link 1232, a fifth Uu link 1234, and a sixth Uu link 1236, respectively. In addition, the first BS 1202 may communicate with the second BS 1204 via an appropriate link (e.g., an X2 link or an Xn link). The first UE (UE 1-1) 1208 communicates with the fourth UE (UE 2-1) 1216 via a first sidelink 1242. In addition, the fourth UE (UE 2-1) 1216 communicates with the second UE (UE 1-2) 1210 via a second sidelink 1244 and with the third UE (UE 1-3) 1212 via a third sidelink 1246. The second UE (UE 1-2) 1210 communicates with the fifth UE (UE 2-2) 1218 via a fourth sidelink 1248. The third UE (UE 1-3) 1212 communicates with the sixth UE (UE 2-3) 1220 via a fifth sidelink 1250. In some examples, the first base station (BS 1) 1202 and the second BS (BS 2) 1204 may correspond to any of the base stations or scheduling entities shown in any of FIGS. 1, 3, 7, 8, 15, and 20. In some examples, the first UE (UE 1-1) 1208, the second UE (UE 1-2) 1210, the third UE (UE 1-3) 1212, the fourth UE (UE 2-1) 1216, the fifth UE (UE 2-2) 1218, and the sixth UE (UE 2-3) 1220 may correspond to any of the UEs or scheduled entities shown in any of FIGS. 1, 3, 7, 8, 15, and 17.

In this example, the UEs are split into three groups with different DRX configurations (e.g., non-overlapping, partially overlapping, etc.). A first group (Group 1) 1254 includes the first UE (UE 1-1) 1208 and the fourth UE (UE 2-1) 1216, and these two UEs are DRX aligned. A second group (DRX Group 2) 1256 includes the second UE (UE 1-2) 1210 and the fifth UE (UE 2-2) 1218, and these two UEs are DRX aligned. A third group (Group 3) 1258 includes the third UE (UE 1-3) 1212 and the sixth UE (UE 2-3) 1220, and these two UEs are DRX aligned.

Figure 13:
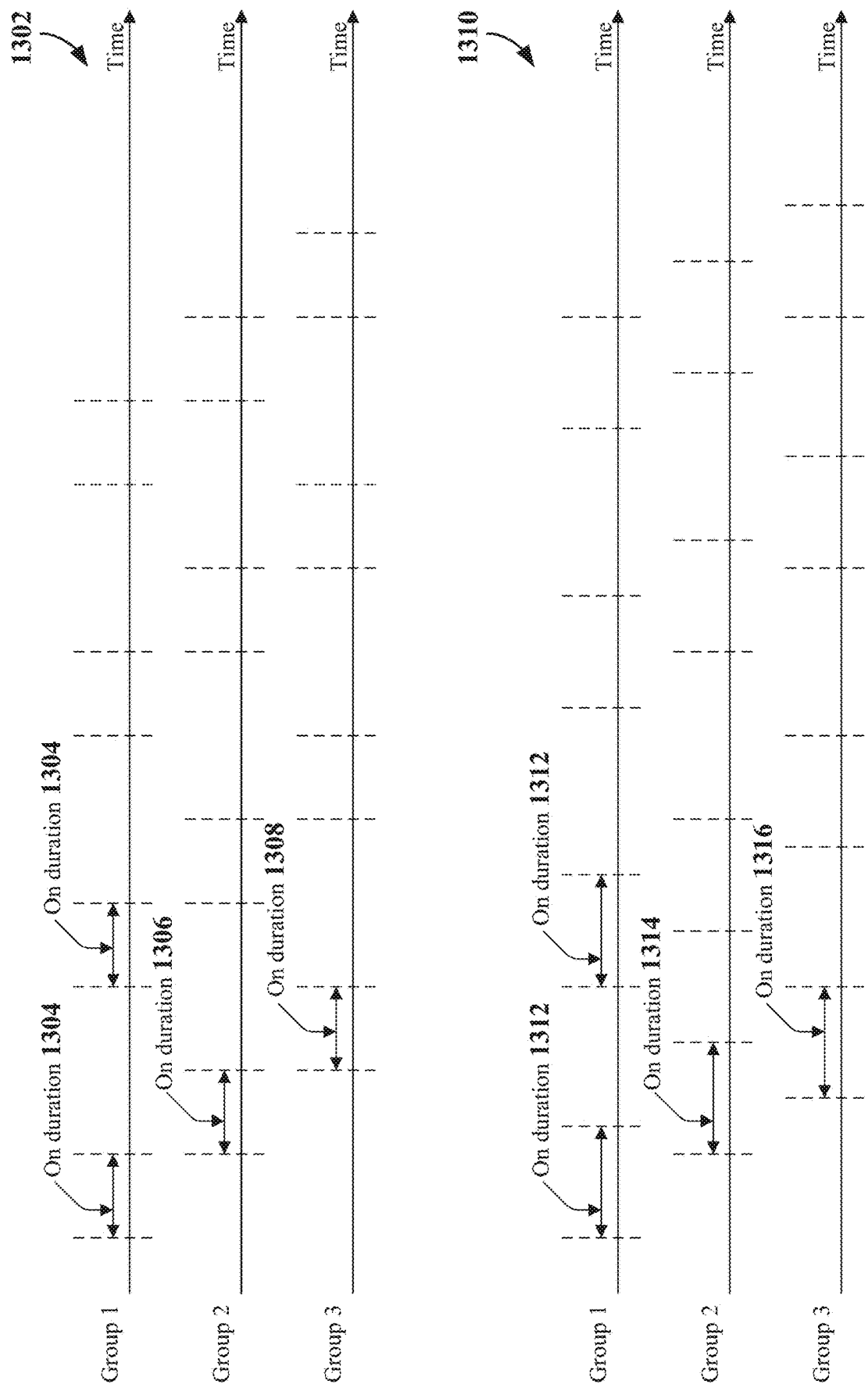
FIG. 13 is a diagram illustrating an example of DRX On durations according to some aspects.

As mentioned above, the DRX group configurations may be configured by one or more base stations. As shown in the timing diagram 1302 of FIG. 13, the DRX group On durations 1304, 1306, and 1308 for UEs in different DRX groups may be non-overlapping in some cases. Conversely, as shown in the timing diagram 1310 of FIG. 13, the DRX group On durations 1312, 1314, and 1316 for UEs in different DRX groups may be partially overlapping in some cases.

Figure 14:
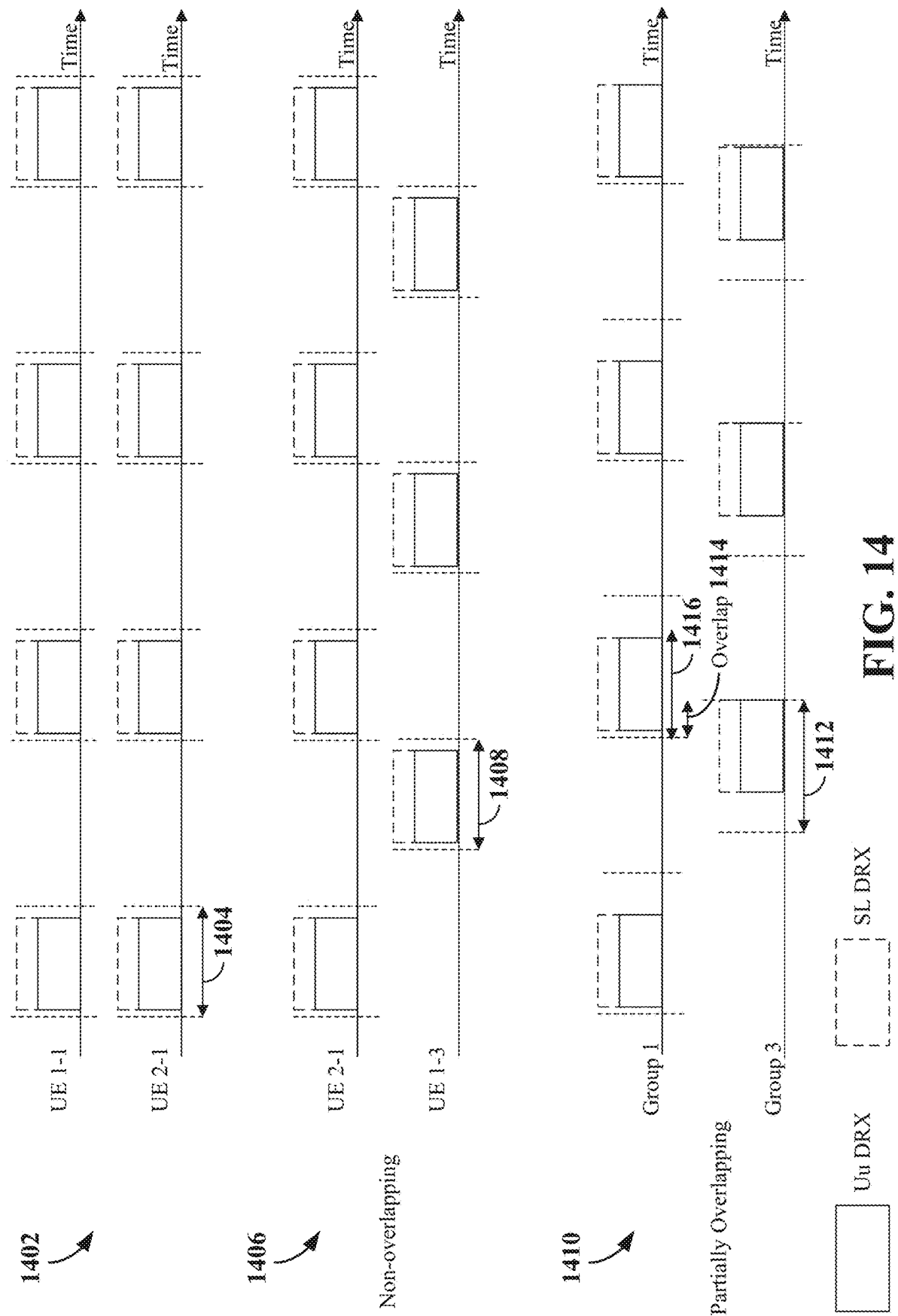
FIG. 14 is a diagram illustrating an example of non-overlapping DRX On durations and partially overlapping DRX On durations according to some aspects.

FIG. 14 illustrates an example where UEs within the same group are aligned, while UEs belonging to different groups are not aligned. In this example, a first UE (UE 1-1) and a second UE (UE 2-1) are both in Group 1, so their DRX configurations are aligned as illustrated in a first timing diagram 1402 with an On duration 1404. As discussed herein, DRX alignment may help reduce the latency and power consumption of communication between the first UE (UE 1-1) and the second UE (UE 2-1). For purposes of illustration, each SL DRX is shown as being offset in the y direction from the corresponding Uu DRX. This need not be the case in an actual implementation.

The second UE (UE 2-1) and a third UE (UE 1-3) are in Group 1 and Group 3, respectively. Thus, in some examples, their DRX configurations may not be aligned as shown in a second timing diagram 1406 with an On duration 1408. Alternatively, in some examples, their DRX configurations may be partially aligned as shown in a third timing diagram 1410 with an On duration 1412. Here, an overlap period 1414 illustrates the partial overlap between the On duration 1412 of Group 3 and the On duration 1416 of Group 1.

In some examples, DRX grouping may be a function of UE-Identity. For example, UEs may be split into groups based on their UE-Identities. If there are N groups, the UE with UE-Identity $UE_{ID}$ belongs to group $UE_{ID}$ mod N in some examples.

In this case, there may be no need for base station (e.g. gNB) coordination of DRX group assignments. For example, a UE may determine, based on its UE-Identity, the DRX group to which the UE belongs.

DRX groups may be imbalanced in some examples (e.g., due to a limited number of UEs) or closely balanced in other examples. For example, if the number of UEs is relatively large, the UE-Identity may be randomly distributed, so that the number of UEs in each group is almost the same. Conversely, if the number of UEs is relatively small, some groups may have more UEs than other groups.

In some examples, DRX grouping may be performed with base station (e.g. gNB) involvement. For example, a base station may select a DRX group (e.g., determine the group ID) for a UE based on one or more of the following factors.

A base station may select a DRX group (e.g., determine the group ID) for a UE based on a UE-Identity. For example, UEs may be split into groups based solely on UE identifiers in some examples.

A base station may select a DRX group (e.g., determine the group ID) for a UE based on an SL connection. For example, if two UEs have no direct SL connection, the UEs can be put into two different groups (e.g., UE 1-1 and UE 2-2 have no direct SL connection, so UE 1-1 is placed into Group 1 and UE 2-2 is placed into Group 2).

A base station may select a DRX group (e.g., determine the group ID) for a UE based on a resource allocation mode. For example, if a UE operates in mode 2 (discussed above), there is no need for type 1 DRX alignment. Thus, UEs operating in mode 2 may be put in different groups (e.g., UE 1-3 and UE 2-1 operate in mode 2, so UE 1-3 is placed into Group 1 and UE 2-1 is placed into Group 2).

A base station may select a DRX group (e.g., determine the group ID) for a UE based on a quality of service (QoS) requirement. For example, UEs with high QoS requirements may be placed in the same group. In this case, since the UEs are DRX aligned, the latency of communication between the UEs may be reduced.

A base station may select a DRX group (e.g., determine the group ID) for a UE based on the status of the DRX group (e.g., the number of UEs in a group, UE traffic, UE throughput, etc.). For example, if a DRX group has a relatively large number of UEs, the base station may avoid putting another UE in this DRX group. As another example, a base station may select a DRX group (e.g., determine the group ID) for a UE based on offered traffic and/or throughput (e.g., if the traffic load of a DRX group is relatively high, the base station may avoid putting another UE in this group).

In some examples, a base station might only have access to the status of the UEs connected to the base station. For example, the base station might not have access to the status of the UEs connected with other base stations. In this case, the DRX group coordination may be a local optimization.

A base station may select a DRX group (e.g., determine the group ID) for a UE based on power consumption of a UE. For example, UEs with low power requirements may be assigned to the same DRX group (e.g., a DRX group that is configured with a longer sleep period). In some examples, if a UE is running out of power, the UE may send a request to the base station to be moved to a low-power DRX group.

In some examples, a base station may prioritize DRX alignment among UEs associated with a different priorities (DRX Group based prioritization). For example, a DRX grouping may be associated with a priority, where all UEs in a given DRX group have the same priority as the DRX group. In some examples, the priorities of different DRX groups may be based on the QoS requirements of the UEs in the DRX groups (e.g., UEs with higher QoS requirements are assigned to a DRX group with a higher priority). As another example, the priority may be based on the number of buffered packets of the UEs in a DRX group (e.g., UEs with more buffered packets are assigned to a DRX group with a higher priority). Other types of priorities may be used in other examples.

In some examples, a base station may make a DRX alignment based on (e.g., in the order of) the DRX group priority. For example, a base station may make a DRX alignment for UEs within the DRX group of the highest priority, then the DRX group of the second highest priority, and so on.

When making a DRX alignment for two UEs in different DRX groups, where the DRX groups have different priorities, the base station may configure a UE associated with a lower priority to accommodate a UE associated with a higher priority. For example, the base station may assign more On durations (e.g., add an On duration for a lower priority UE to allow that UE to also align with an On duration of a higher priority UE). As another example, the base station may change the On durations (e.g., change the On duration for a lower priority UE to align with an On duration of a higher priority UE).

Referring to the example of FIG. 12, the first group (DRX Group 1) 1254 may have a higher priority than the second group (DRX Group 2) 1256, and the second group (DRX Group 2) 1256 may have a higher priority than the third group (DRX Group 3) 1258. Thus, a base station may first make a DRX alignment for the first UE (UE 1-1) 1208 and the fourth UE (UE 2-1) 1216.

The base station may then make a DRX alignment for the second UE (UE 1-2) 1210 and the fifth UE (UE 2-2) 1218. Here, the second UE (UE 1-2) 1210 has a sidelink connection with the fourth UE (UE 2-1) 1216 (which has a higher priority than the second UE (UE 1-2) 1210). Thus, the second UE (UE 1-2) 1210 may be configured to accommodate the fourth UE (UE 2-1) 1216 when making the DRX alignment.

Next, the base station may make a DRX alignment for the third UE (UE 1-3) 1212 and the sixth UE (UE 2-3) 1220. In this case, the third UE (UE 1-3) 1212 has a sidelink connection with the fourth UE (UE 2-1) 1216 (which has a higher priority than the third UE (UE 1-3) 1212). Thus, the third UE (UE 1-3) 1212 may be configured to accommodate the fourth UE (UE 2-1) 1216 when making the DRX alignment.

Figure 15:
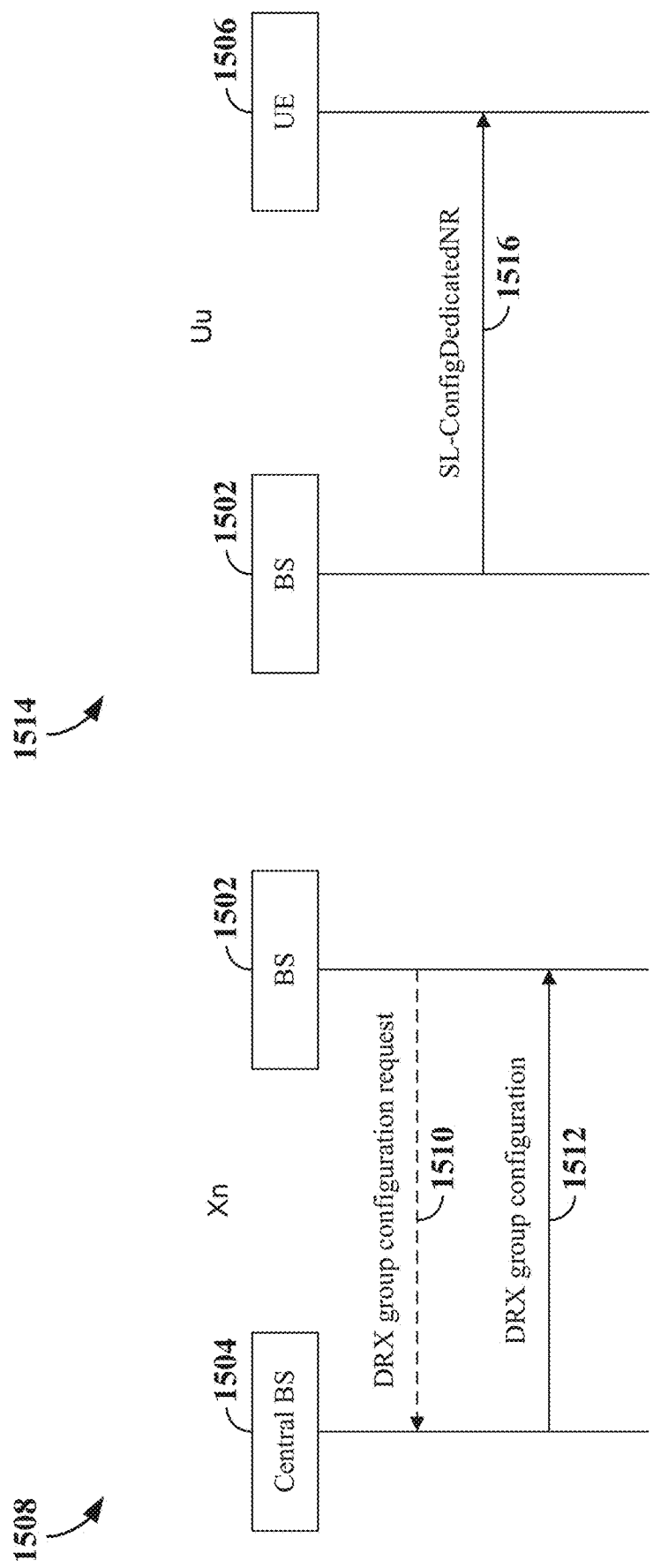
FIG. 15 is a signaling diagram illustrating an example of signaling associated with a DRX group configuration according to some aspects.

FIG. 15 illustrates examples of DRX group configuration-related signaling in a wireless communication system including a base station (BS) 1502, a central BS 1504, and a UE 1506. In some examples, the BS 1502 and the central BS 1504 may correspond to any of the base stations or scheduling entities shown in any of FIGS. 1, 3, 7, 8, 12, and 20. In some examples, the UE 1506 may correspond to any of the UEs or scheduled entities shown in any of FIGS. 1, 3, 7, 8, 12, and 17.

The disclosure relates in some aspects to signaling of DRX group configurations (DRX grouping configuration) among base stations. A base station may maintain DRX grouping information (e.g., a DRX grouping configuration) including, for example, the number of DRX groups, the start/offset (e.g., relative to the start of a frame) and duration (e.g., in number of symbols) of each DRX group, and the group ID of each connected UE. In some examples, the base station may assign a corresponding DRX group ID for each connected UE and transmit an indication of the corresponding DRX group ID to each UE.

In some examples, the DRX group configuration may be determined by a central base station. The central base station may select the DRX grouping configuration and send the configuration to the other base stations (e.g., through an Xn interface). The other base stations may also request the DRX group configuration (e.g., through the Xn interface).

Referring to a first diagram 1508 of FIG. 15, the BS 1502 may optionally send a request for a DRX group configuration 1510 to the central BS 1504. In response, the central BS 1504 may send the DRX group configuration 1512 (e.g., in its entirety) to the BS 1502.

In some examples, the DRX group configuration may be defined as an XnAP message (e.g., the content of which may be as shown in Table 1). The duration of each DRX group might not be the same. The number of SRXGroupConfig-Items in DRXGroupConfig may implicitly indicate the number of DRX groups. In some examples, the $i^{th}$ item in the configuration represents the configuration of DRX Group i. Thus, a DRX Group ID need not be included in the configuration. In some aspects, the DRXGroupStartOffset together with the SRXGroupDuration defines the On durations for corresponding DRX group. In some examples, the DRXGroupPriority of a DRX group may be represented by an integer number in the DRX group configuration.

TABLE 1

DRXGroupConfig ::= SEQUENCE (SIZE(1..maxnoofDRXGroups)) OF DRXGroupConfig-Item
DRXGroupConfig-Item ::= SEQUENCE {
  DRXGroupStartOffset
  DRXGroupDuration
  DRXGroupPriority
}

In some examples, base stations may negotiate to determine a DRX group configuration. For example, a first base station may propose a DRX group configuration and sent it to a second base station via an Xn interface. The second base station may accept or reject the proposed DRX group configuration. In the former case, the second base station may initially send assistance information to the first base station that includes the state of the second base station's connected UEs (e.g., the number of connected UEs and their traffic load). In response, the first base station may send the proposed DRX group configuration to the second base station and the second base station may respond with an accept message. In the latter case, the second base station may propose a different DRX group configuration and sent it to the first base station. The first base station may then either accept or reject the newly proposed DRX group configuration.

If the DRX grouping information is maintained by a base station, the base station may inform its UEs as to their group IDs. In examples where the DRX grouping does not change frequently, L3 signaling may be used to send the group ID. For example, a field sl-DRX-Group-ID may be defined in an RRC information element (IE) SL-ConfigDedicatedNR (an example of which is shown in Table 2), which indicates the DRX group ID to which the UE belongs. In some examples, the priority of a DRX group may be represented by an integer number in the DRX group configuration. Other signaling may be used in other examples.

ConfigDedicatedNR message 1516 including a DRX Group ID for the UE 1506 to the UE 1506. In some examples, this message may be sent even if the DRX Group ID assignment is based on the UE-Identity (e.g., since the UE 1506 might not know the number N of DRX Groups).

If DRX grouping is based on UE-Identity, this message might not be used. For example, in this case a UE can derive its DRX group from its UE-Identity.

The disclosure relates in some aspects to signaling UE assistance information. For example, a bi-directional DRX alignment procedure may include a Step 1 that involves a Rx UE sending assistance information to a Tx UE, which then forwards this information to the Tx UE's base station.

In some examples, the UE assistance information may include DRX group information. For example, a Rx UE may send assistance information that includes the Rx UE's DRX Group ID to a Tx UE. The Tx UE may forward this information to its base station. The Tx UE's base station may then use the Rx UE's DRX group information to make a DRX alignment and configure the DRX for the UEs. The base station may then send a message to each UE to configure the respective UE's DRX configuration. As discussed herein, the DRX alignment between a Tx UE and a Rx UE is based on their DRX grouping configuration. In some examples, the assistance information sent from the Rx UE to the Tx UE and then to the Tx UE's base station includes an SL RRC IE SL-DRXGroup parameter (e.g., which may indicate the Rx UE's DRX group ID). In some examples (e.g., when the Tx UE's base station maintains the DRX grouping information), the Tx UE does not append its DRX group information to the assistance information sent to its gNB.

The disclosure relates in some aspects to DRX alignment between different DRX groups. For example, if two UEs that communicate on a sidelink are not in the same DRX group, their DRX configurations might not be completely aligned. For example, their DRX configurations may be partially aligned or not aligned at all.

In some examples (Example 1), no Type 1 DRX alignment is provided between UEs. For example, two UEs may be in different groups, where they are aligned with other UEs within their respective group (e.g., both type 1 and type 2),

TABLE 2

```
-- ASN1START
-- TAG-SL-CONFIGDEDICATEDNR-START
SL-ConfigDedicatedNR-r16 ::=          SEQUENCE {
  sl-PHY-MAC-RLC-Config-r16              SL-PHY-MAC-RLC-Config-r16
                                                           OPTIONAL,  -- Need M
  sl-RadioBearerToReleaseList-r16        SEQUENCE (SIZE (1..maxNrofSLRB-r16))
OF SLRB-Uu-ConfigIndex-r16             OPTIONAL,  -- Need N
  sl-RadioBearerToAddModList-r16         SEQUENCE (SIZE (1..maxNrofSLRB-r16))
OF SL-RadioBearerConfig-r16            OPTIONAL,  -- Need N
  sl-MeasConfigInfoToReleaseList-r16       SEQUENCE (SIZE (1..maxNrofSL-Dest-
r16)) OF SL-DestinationIndex-r16       OPTIONAL,  -- Need N
  sl-MeasConfigInfoToAddModList-r16        SEQUENCE (SIZE (1..maxNrofSL-Dest-
r16)) OF SL-MeasConfigInfo-r16         OPTIONAL,  -- Need M
  t400-r16                             ENUMERATED {ms100, ms200, ms300, ms400, ms600,
ms1000, ms1500, ms2000}                OPTIONAL,  -- Need M
  sl-DRXGroupId                        INTEGER (1..maxSLDRXGroup)  OPTIONAL,  -- Need M
  . . .
}
-- TAG-SL-CONFIGDEDICATEDNR-STOP
-- ASN1STOP
```

Referring to a second diagram 1514 of FIG. 15, the BS 1502 may send DRX configuration information to each of its serving UEs. For example, the BS 1502 may send a SLbut there is no type 1 DRX alignment between these two UEs. However, even though the UEs are in different groups, type 2 DRX alignment is still achieved. If a Tx UE receives a sidelink grant or data from its base station, the Tx UE will wait for the Rx UE's next SL DRX On duration to initiate the sidelink transmission. In this case, the Tx UE's base station may be informed of the Rx UE's SL DRX so that the base station can adjust the sidelink grant so that the allocated resource is within the Rx UE's next SL DRX On duration.

In some examples (Example 2), UEs may extend their SL DRX or Uu DRX to achieve Type 1 DRX alignment. For example, for UEs that are in different groups, one or more of the UEs may extend their SL DRX or Uu DRX On durations, so that the Tx UE's Uu DRX is overlapped (partially or fully) with the Rx UE's SL DRX. As another example, the Rx UE may add an SL On duration, or the Tx UE may add an Uu On duration, so that the Tx UE's Uu On duration overlaps with the Rx UE's SL On duration.

Figure 16:
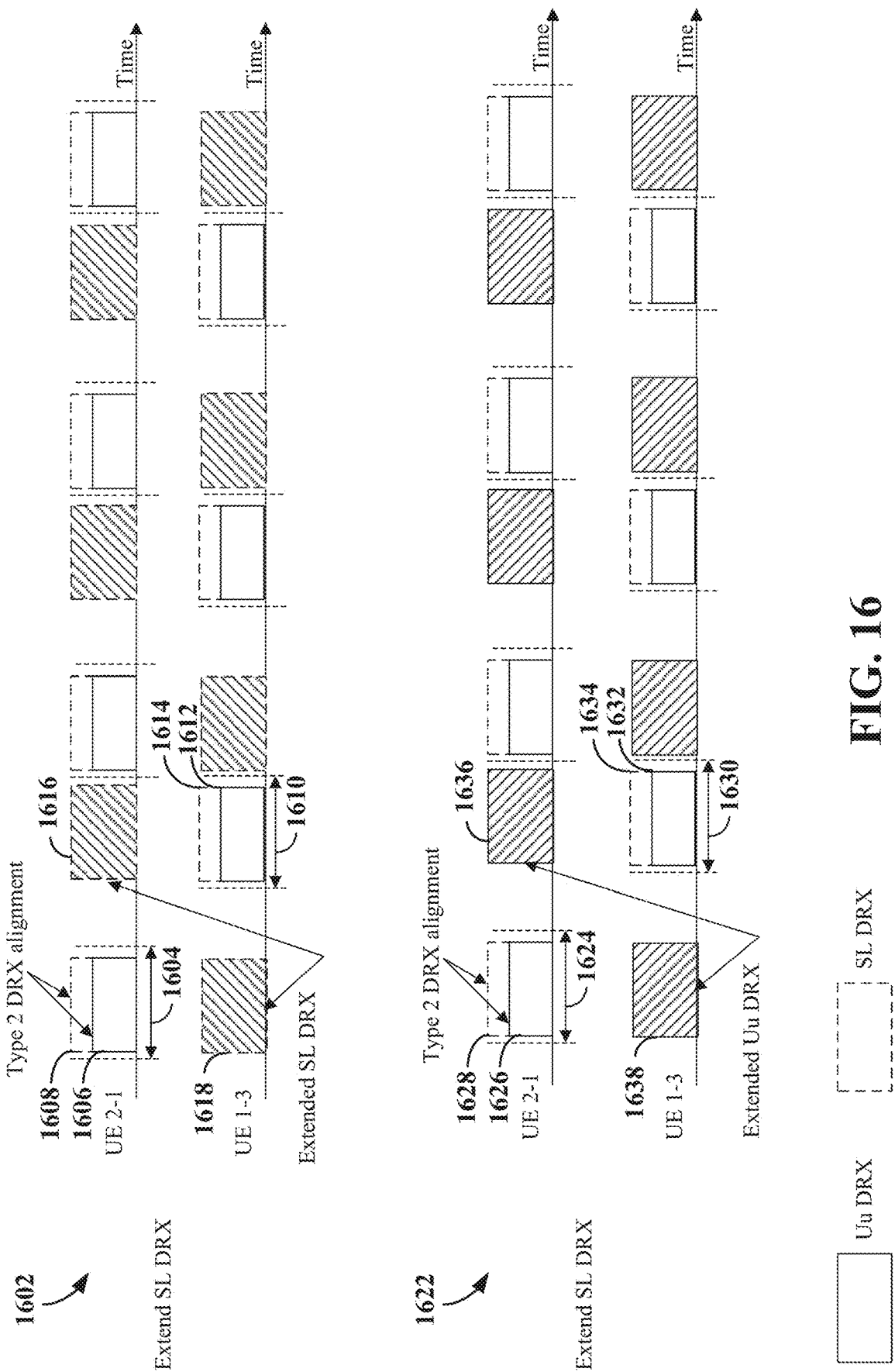
FIG. 16 is a diagram illustrating examples of extended DRXs according to some aspects.

Referring to a first diagram 1602 of FIG. 16, an On duration 1604 for a first UE (UE 2-1) in a first DRX group is defined for a Uu DRX 1606 and an SL DRX 1608. In addition, an On duration 1610 for a second UE (UE 1-3) in a second DRX group is defined for a Uu DRX 1612 and an SL DRX 1614.

However, the On duration 1604 for the first UE (UE 2-1) does not align with the On duration 1610 for the second UE (UE 1-3). This presents an issue in the event the first UE (UE 2-1) is to communicate with the second UE (UE 1-3) via a sidelink.

To address this issue, in the case where the first UE (UE 2-1) is the Rx UE and the second UE (UE 1-3) is the Tx UE, an On duration 1616 may be added for the first UE (UE 2-1) for SL DRX so that the first UE (UE 2-1) will have an SL On duration that overlaps with the Uu On duration for the second UE (UE 1-3). Thus, when the second UE (UE 1-3) receives an SL grant and data from its base station during On duration 1610, the second UE (UE 1-3) may forward the data to the first UE (UE 2-1) during its On duration 1616. As another example, in the case where the first UE (UE 2-1) is the Tx UE and the second UE (UE 1-3) is the Rx UE, an On duration 1618 may be added for the second UE (UE 1-3) for SL DRX so that the second UE (UE 1-3) will have a SL On duration that overlaps with the Uu On duration 1604 for the first UE (UE 2-1). Thus, when the first UE (UE 2-1) receives an SL grant and data from its base station during On duration 1604, the first UE (UE 2-1) may forward the data to the second UE (UE 1-3) during its On duration 1618. For a bi-directional connection, both UEs may extend their SL DRXs (e.g., add additional On durations) as shown in FIG. 16.

Referring to a second diagram 1622 of FIG. 16, an On duration 1624 for a first UE (UE 2-1) in a first DRX group is defined for a Uu DRX 1626 and an SL DRX 1628. In addition, an On duration 1630 for a second UE (UE 1-3) in a second DRX group is defined for a Uu DRX 1632 and an SL DRX 1634.

As above, the On duration 1624 for the first UE (UE 2-1) does not align with the On duration 1630 for the second UE (UE 1-3). This presents an issue in the event the first UE (UE 2-1) is to communicate with the second UE (UE 1-3) via a sidelink.

To address this issue, in the case where the first UE (UE 2-1) is the Tx UE and the second UE (UE 1-3) is the Rx UE, an On duration 1636 may be added for the first UE (UE 2-1) for Uu DRX so that the first UE (UE 2-1) will have an Uu On duration that overlaps with the SL On duration for the second UE (UE 1-3). Thus, when the first UE (UE 2-1) receives an SL grant and data from its base station during On duration 1636, the first UE (UE 2-1) may forward the data to the second UE (UE 1-3) during its On duration 1630. As another example, in the case where the first UE (UE 2-1) is the Rx UE and the second UE (UE 1-3) is the Tx UE, an On duration 1638 may be added for the second UE (UE 1-3) for Uu DRX so that the second UE (UE 1-3) will have a Uu On duration that overlaps with the SL On duration 1604 for the first UE (UE 2-1). Thus, when the second UE (UE 1-3) receives an SL grant and data from its base station during On duration 1638, the second UE (UE 1-3) may forward the data to the first UE (UE 2-1) during its On duration 1624. For a bi-directional connection, both UEs may extend their Uu DRXs (e.g., add additional On durations) as shown in FIG. 16.

In Example 1, the UEs do not extend their On duration. Thus, the power consumption of the UEs may be lower as compared to Example 2. However, in Example 1, a Tx UE may need to wait for the next On duration of a Rx UE, while in Example 2, a Tx UE may initiate a transmission within the current On duration. Thus, latency may be lower in Example 2 as compared to Example 1.

Figure 17:
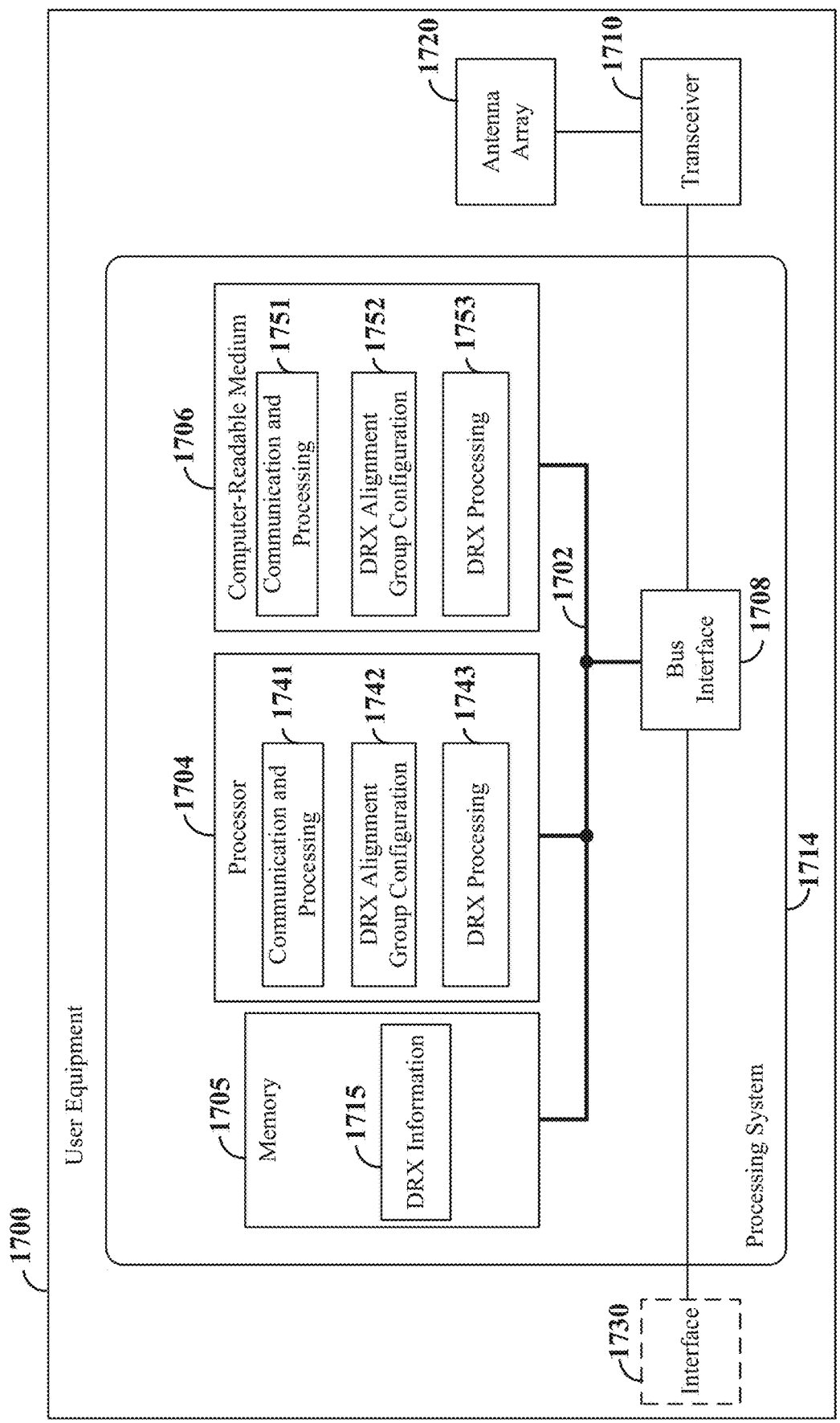
FIG. 17 is a block diagram illustrating an example of a hardware implementation for a user equipment employing a processing system according to some aspects.

FIG. 17 is a conceptual diagram illustrating an example of a hardware implementation for a user equipment (UE) 1700 employing a processing system 1714. In some examples, the user equipment 1700 may be a UE or scheduled entity configured to wirelessly communicate with a base station or scheduling entity, as discussed in any one or more of FIGS. 1-16. In some examples, the user equipment 1700 may correspond to any of the UEs, sidelink devices, D2D devices, or scheduled entities shown in any of FIGS. 1, 3 7, 8, 12, and 15.

In accordance with various aspects of the disclosure, an element, or any portion of an element, or any combination of elements may be implemented with the processing system 1714. The processing system 1714 may include one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the user equipment 1700 may be configured to perform any one or more of the functions described herein. That is, the processor 1704, as utilized in a user equipment 1700, may be used to implement any one or more of the methods described herein.

The processor 1704 may in some instances be implemented via a baseband or modem chip and in other implementations, the processor 1704 may itself include a number of devices distinct and different from a baseband or modem chip (e.g., in such scenarios these devices may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 communicatively couples together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further. A bus interface 1708 provides an interface between the bus 1702 and a transceiver 1710 and an antenna array 1720 and between the bus 1702 and an interface 1730. The transceiver 1710 provides a means for communicating with various other apparatus over a transmission medium (e.g., air interface). The interface 1730 provides a communication interface or means of communicating with various other apparatuses and devices (e.g., other devices housed within the same apparatus as the user equipment 1700 or other external apparatuses) over an internal bus or external transmission medium. Depending upon the nature of the user equipment 1700, the interface 1730 may include a user interface (e.g., keypad, display, speaker, microphone, joystick). Of course, such a user interface is optional, and may be omitted in some examples, such as an IoT device.

The processor 1704 is responsible for managing the bus 1702 and general processing, including the execution of software stored on the computer-readable medium 1706. The software, when executed by the processor 1704, causes the processing system 1714 to perform the various functions described below for any particular apparatus. The computer-readable medium 1706 and the memory 1705 may also be used for storing data that is manipulated by the processor 1704 when executing software. For example, the memory 1705 may store DRX information 1715 used by the processor 1704 in cooperation with the transceiver 1710 for DRX-related communication.

One or more processors 1704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1706.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. In some examples, the computer-readable medium 1706 may be part of the memory 1705. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1704 may include circuitry configured for various functions. In some aspects, processor 1704 may include circuitry for performing one or more of the operations described herein with respect to FIGS. 1-16 and 18-19.

The processor 1704 may include communication and processing circuitry 1741, configured to communicate with a base station and one or more other wireless communication devices over a common carrier shared between a cellular (e.g., Uu) interface and a sidelink (e.g., PC5) interface. In some examples, the communication and processing circuitry 1741 may include one or more hardware components that provide the physical structure that performs processes related to wireless communication (e.g., signal reception and/or signal transmission) and signal processing (e.g., processing a received signal and/or processing a signal for transmission). The communication and processing circuitry 1741 may further be configured to execute communication and processing software 1751 stored on the computer-readable medium 1706 to implement one or more functions described herein.

In some implementations where the communication involves receiving information, the communication and processing circuitry 1741 may obtain information from a component of the user equipment 1700 (e.g., from the transceiver 1710 that receives the information via radio frequency signaling or some other type of signaling suitable for the applicable communication medium), process (e.g., decode) the information, and output the processed information. For example, the communication and processing circuitry 1741 may output the information to another component of the processor 1704, to the memory 1705, or to the bus interface 1708. In some examples, the communication and processing circuitry 1741 may receive one or more of signals, messages, SCIs, feedback, other information, or any combination thereof. In some examples, the communication and processing circuitry 1741 may receive information via one or more of a PSCCH, a PSSCH, a PSFCH, some other type of channel, or any combination thereof. In some examples, the communication and processing circuitry 1741 may include functionality for a means for receiving (e.g., means for receiving a signal and/or means for receiving control information). In some examples, the communication and processing circuitry 1741 may include functionality for a means for decoding.

In some implementations where the communication involves sending (e.g., transmitting) information, the communication and processing circuitry 1741 may obtain information (e.g., from another component of the processor 1704, the memory 1705, or the bus interface 1708), process (e.g., encode) the information, and output the processed information. For example, the communication and processing circuitry 1741 may output the information to the transceiver 1710 (e.g., that transmits the information via radio frequency signaling or some other type of signaling suitable for the applicable communication medium). In some examples, the communication and processing circuitry 1741 may send one or more of signals, messages, SCIs, feedback, other information, or any combination thereof. In some examples, the communication and processing circuitry 1741 may send information via one or more of a PSCCH, a PSSCH, a PSFCH, some other type of channel, or any combination thereof. In some examples, the communication and processing circuitry 1741 may include functionality for a means for sending (e.g., means for transmitting). In some examples, the communication and processing circuitry 1741 may include functionality for a means for encoding.

The processor 1704 may include DRX alignment group configuration circuitry 1742 configured to perform DRX alignment group configuration-related operations as discussed herein (e.g., one or more of the operations described in conjunction with FIGS. 7-16). The DRX alignment group configuration circuitry 1742 may be configured to execute DRX alignment group configuration software 1752 included on the computer-readable medium 1706 to implement one or more functions described herein.

The DRX alignment group configuration circuitry 1742 may include functionality for a means for receiving an indication of at least one DRX alignment group. For example, the DRX alignment group configuration circuitry 1742 may be configured to monitor an allocated resource (e.g., a PSSCH or a PDSCH) for a message that contains a DRX alignment group indication. In addition, the DRX alignment group configuration circuitry 1742 may be configured to parse the message to extract the DRX alignment group indication from the message. In some examples, the DRX alignment group configuration circuitry 1742 may be configured to use an index (e.g., included in the message) to identify a particular DRX alignment group from a set (e.g., a table) of DRX alignment groups maintained by the user equipment 1700. In some examples, the DRX alignment group configuration circuitry 1742 may be configured to maintain a DRX alignment group configuration in a memory device.

In some examples, the DRX alignment group configuration circuitry 2042 may receive or otherwise obtain a DRX configuration that specifies alignment of Uu DRX for a first user equipment and SL DRX for a second user equipment of a DRX alignment group. In some examples, the DRX alignment group configuration circuitry 2042 may receive or otherwise obtain a DRX configuration that specifies alignment of Uu DRX for the first user equipment and SL DRX for the first user equipment. In some examples, the DRX alignment group configuration circuitry 2042 may receive or otherwise obtain a DRX configuration that specifies alignment of SL DRX for the first user equipment and Uu DRX for the second user equipment. In some examples, the DRX alignment group configuration circuitry 2042 may receive or otherwise obtain a DRX configuration that specifies alignment of Uu DRX for the second user equipment and SL DRX for the second user equipment.

The processor 1704 may include DRX processing circuitry 1743 configured to perform DRX processing-related operations as discussed herein (e.g., one or more of the operations described in conjunction with FIGS. 7-16). The DRX processing circuitry 1743 may be configured to execute DRX processing software 1753 included on the computer-readable medium 1706 to implement one or more functions described herein.

The DRX processing circuitry 1743 may include functionality for a means for receiving a data transmission according to a DRX alignment group. For example, the DRX processing circuitry 1743 may be configured to wake from a low power mode at intervals specified by a DRX configuration of the DRX alignment group to receive a data transmission on an allocated resource (e.g., a PSSCH or a PDSCH).

Figure 18:
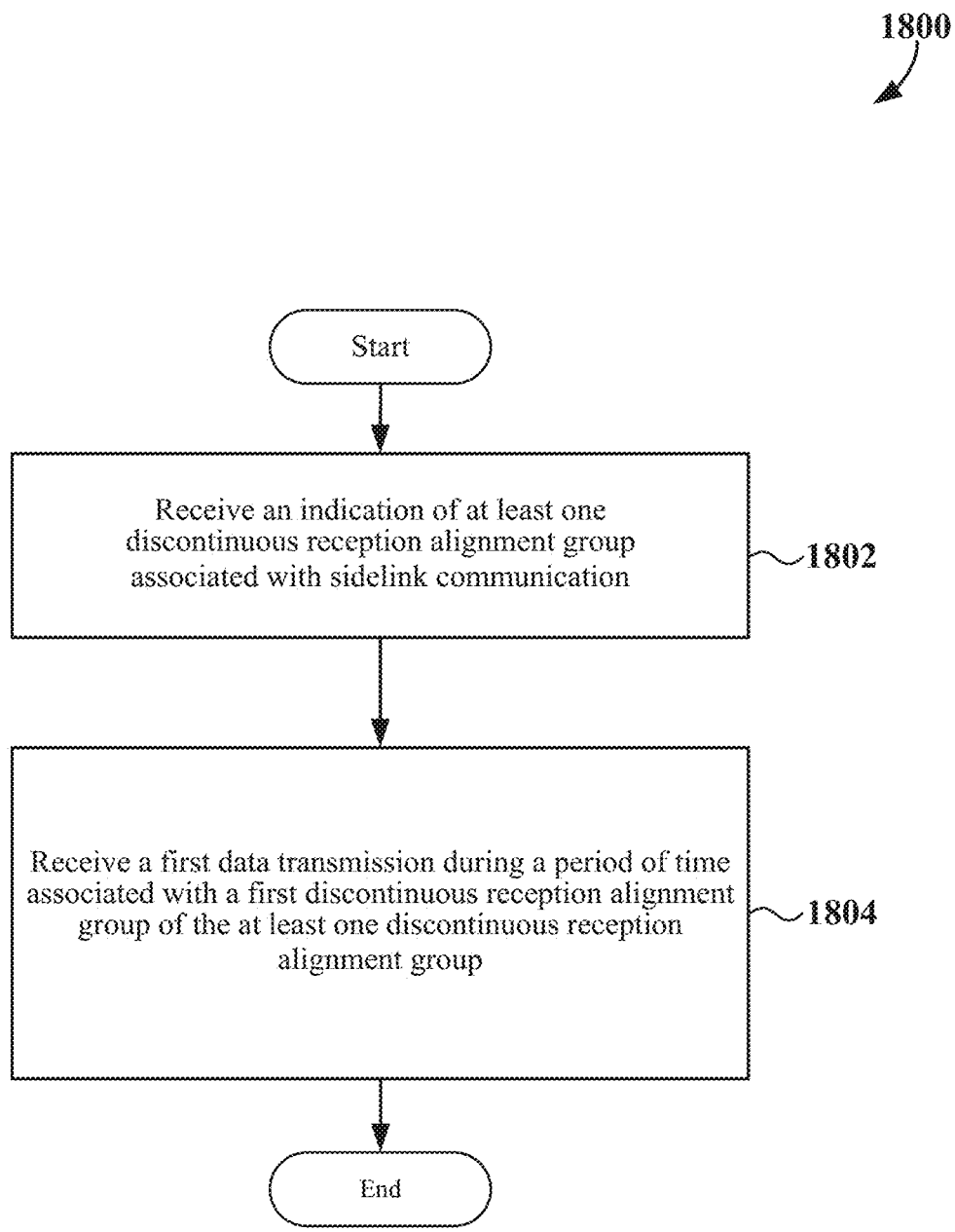
FIG. 18 is a flow chart of an example method that involves receiving an indication of at least one DRX alignment group according to some aspects.

FIG. 18 is a flow chart of a method 1800 for wireless communication according to some aspects. As described below, some or all illustrated features may be omitted in a particular implementation within the scope of the present disclosure, and some illustrated features may not be required for implementation of all examples. In some examples, the method 1800 may be performed by the user equipment 1700 (e.g., performed by the processing system 1714), as described above and illustrated in FIG. 17, by a processor or processing system, or by any suitable means for carrying out the described functions.

At block 1802, a user equipment may receive an indication of at least one discontinuous reception alignment group associated with sidelink communication. For example, the DRX alignment group configuration circuitry 1742 together with the communication and processing circuitry 1741 and the transceiver 1710, shown and described above in connection with FIG. 17, may provide a means to receive an indication of at least one discontinuous reception alignment group associated with sidelink communication.

At block 1804, a user equipment may receive a first data transmission during a period of time associated with a first discontinuous reception alignment group of the at least one discontinuous reception alignment group. For example, the DRX processing circuitry 1743 together with the communication and processing circuitry 1741 and the transceiver 1710, shown and described above in connection with FIG. 17, may provide a means to receive a first data transmission during a period of time associated with a first discontinuous reception alignment group of the at least one discontinuous reception alignment group.

In some examples, the first discontinuous reception alignment group is associated with at least one of a first alignment of Uu discontinuous reception for the first user equipment and sidelink discontinuous reception for a second user equipment of the first discontinuous reception alignment group, a second alignment of Uu discontinuous reception for the first user equipment and sidelink discontinuous reception for the first user equipment, a third alignment of sidelink discontinuous reception for the first user equipment and Uu discontinuous reception for the second user equipment, or a fourth alignment of Uu discontinuous reception for the second user equipment and sidelink discontinuous reception for the second user equipment.

In some examples, the at least one discontinuous reception alignment group is the first discontinuous reception alignment group. In some examples, the at least one discontinuous reception alignment group may include a plurality of discontinuous reception alignment groups. In some examples, the first user equipment may identify the first discontinuous reception alignment group based on an identifier of the first user equipment. In some examples, a first discontinuous reception configuration associated with the first discontinuous reception alignment group is different from a second discontinuous reception configuration associated with a second discontinuous reception alignment group of the plurality of discontinuous reception alignment groups. In some examples, the first discontinuous reception alignment group configuration may include at least one of: an indication of how many discontinuous reception alignment groups have been defined, a start time for each discontinuous reception alignment group of the plurality of discontinuous reception alignment groups, a time offset for each discontinuous reception alignment group of the plurality of discontinuous reception alignment groups, a time duration for each discontinuous reception alignment group of the plurality of discontinuous reception alignment groups, an identifier of each user equipment assigned to each discontinuous reception alignment group of the plurality of discontinuous reception alignment groups, or a combination thereof.

In some examples, the first user equipment may transmit the indication of the at least one discontinuous reception alignment group to a second user equipment via a sidelink channel. In some examples, the first user equipment may transmit an indication of the first discontinuous reception alignment group to a second user equipment via a sidelink channel. In some examples, the first user equipment may transmit the indication of the at least one discontinuous reception alignment group to a base station that serves the first user equipment. In some examples, the first user equipment may transmit an indication of the first discontinuous reception alignment group to a base station that serves the first user equipment.

In some examples, the first user equipment may extend a first sidelink discontinuous reception duration to communicate with a second user equipment that is assigned to a second discontinuous reception alignment group that is different from the first discontinuous reception alignment group.

In some examples, the first sidelink discontinuous reception duration is associated with a PC5 link. In some examples, the first sidelink discontinuous reception duration is associated with a Uu link.

In some examples, a first discontinuous reception configuration associated with the first discontinuous reception alignment group is different from a second discontinuous reception configuration associated with a second discontinuous reception alignment group of the at least one discontinuous reception alignment group.

In some examples, the period of time associated with the first discontinuous reception alignment group does not overlap a period of time associated with a second discontinuous reception alignment group of the at least one discontinuous reception alignment group. In some examples, the period of time associated with the first discontinuous reception alignment group partially overlaps a period of time associated with a second discontinuous reception alignment group of the at least one discontinuous reception alignment group.

Figure 19:
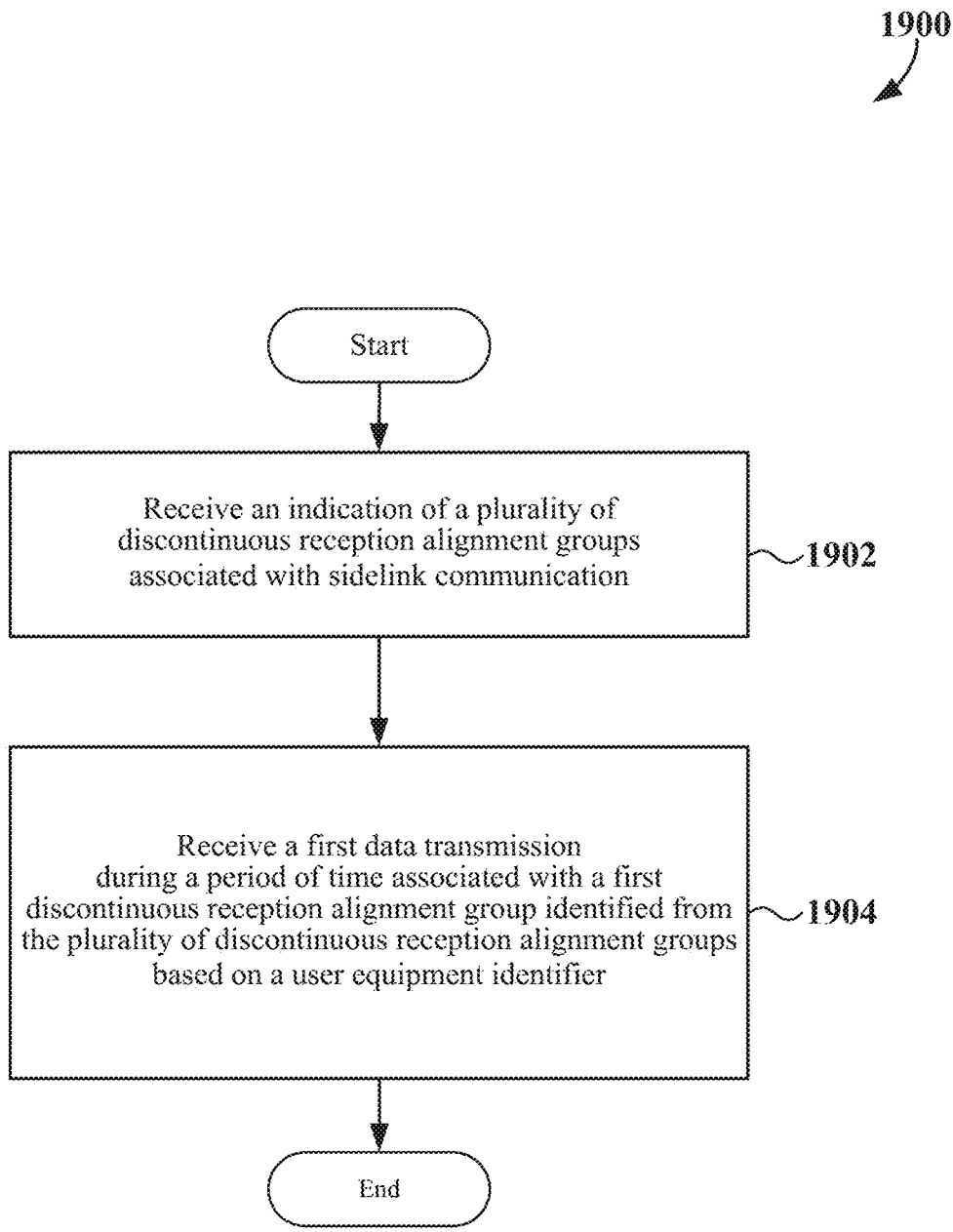
FIG. 19 is a flow chart of an example method that involves receiving an indication of a plurality of DRX alignment groups according to some aspects.

FIG. 19 is a flow chart of a method 1900 for wireless communication according to some aspects. As described below, some or all illustrated features may be omitted in a particular implementation within the scope of the present disclosure, and some illustrated features may not be required for implementation of all examples. In some examples, the method 1900 may be performed by the user equipment 1700 (e.g., performed by the processing system 1714), as described above and illustrated in FIG. 17, by a processor or processing system, or by any suitable means for carrying out the described functions.

At block 1902, a user equipment may receive an indication of a plurality of discontinuous reception alignment groups associated with sidelink communication. For example, the DRX alignment group configuration circuitry 1742 together with the communication and processing circuitry 1741 and the transceiver 1710, shown and described above in connection with FIG. 17, may provide a means to receive an indication of a plurality of discontinuous reception alignment groups associated with sidelink communication.

At block 1904, a user equipment may receive a first data transmission during a period of time associated with a first discontinuous reception alignment group identified from the plurality of discontinuous reception alignment groups based on a user equipment identifier. For example, the DRX processing circuitry 1743 together with the communication and processing circuitry 1741 and the transceiver 1710, shown and described above in connection with FIG. 17, may provide a means to receive a first data transmission during a period of time associated with a first discontinuous reception alignment group identified from the plurality of discontinuous reception alignment groups based on a user equipment identifier.

In some examples, the first discontinuous reception alignment group is associated with at least one of a first alignment of Uu discontinuous reception for the first user equipment and sidelink discontinuous reception for a second user equipment of the first discontinuous reception alignment group, a second alignment of Uu discontinuous reception for the first user equipment and sidelink discontinuous reception for the first user equipment, a third alignment of sidelink discontinuous reception for the first user equipment and Uu discontinuous reception for the second user equipment, or a fourth alignment of Uu discontinuous reception for the second user equipment and sidelink discontinuous reception for the second user equipment.

In some examples, the first user equipment may identify the first discontinuous reception alignment group based on an identifier of the first user equipment. In some examples, a first discontinuous reception configuration associated with the first discontinuous reception alignment group is different from a second discontinuous reception configuration associated with a second discontinuous reception alignment group of the plurality of discontinuous reception alignment groups. In some examples, the first discontinuous reception alignment group configuration may include at least one of: an indication of how many discontinuous reception alignment groups have been defined, a start time for each discontinuous reception alignment group of the plurality of discontinuous reception alignment groups, a time offset for each discontinuous reception alignment group of the plurality of discontinuous reception alignment groups, a time duration for each discontinuous reception alignment group of the plurality of discontinuous reception alignment groups, an identifier of each user equipment assigned to each discontinuous reception alignment group of the plurality of discontinuous reception alignment groups, or a combination thereof.

In some examples, the first user equipment may transmit the indication of the plurality of discontinuous reception alignment groups to a second user equipment via a sidelink channel. In some examples, the first user equipment may transmit an indication of the first discontinuous reception alignment group to a second user equipment via a sidelink channel. In some examples, the first user equipment may transmit the indication of the plurality of discontinuous reception alignment groups to a base station that serves the first user equipment. In some examples, the first user equipment may transmit an indication of the first discontinuous reception alignment group to a base station that serves the first user equipment.

In some examples, the first user equipment may extend a first sidelink discontinuous reception duration to communicate with a second user equipment that is assigned to a second discontinuous reception alignment group that is different from the first discontinuous reception alignment group.

In some examples, the first sidelink discontinuous reception duration is associated with a PC5 link. In some examples, the first sidelink discontinuous reception duration is associated with a Uu link.

In some examples, a first discontinuous reception configuration associated with the first discontinuous reception alignment group is different from a second discontinuous reception configuration associated with a second discontinuous reception alignment group of the plurality of discontinuous reception alignment groups.

In some examples, the period of time associated with the first discontinuous reception alignment group does not overlap a period of time associated with a second discontinuous reception alignment group of the plurality of discontinuous reception alignment groups. In some examples, the period of time associated with the first discontinuous reception alignment group partially overlaps a period of time associated with a second discontinuous reception alignment group of the plurality of discontinuous reception alignment groups.

In one configuration, the user equipment 1700 includes means for receiving an indication of at least one discontinuous reception alignment group associated with sidelink communication, and means for receiving a first data transmission during a period of time associated with a first discontinuous reception alignment group of the at least one discontinuous reception alignment group. In one aspect, the aforementioned means may be the processor 1704 shown in FIG. 17 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable medium 1706, or any other suitable apparatus or means described in any one or more of FIGS. 1, 3, 7, 8, 12, 15 and 17 and utilizing, for example, the methods and/or algorithms described herein in relation to FIGS. 18-19.

Figure 20:
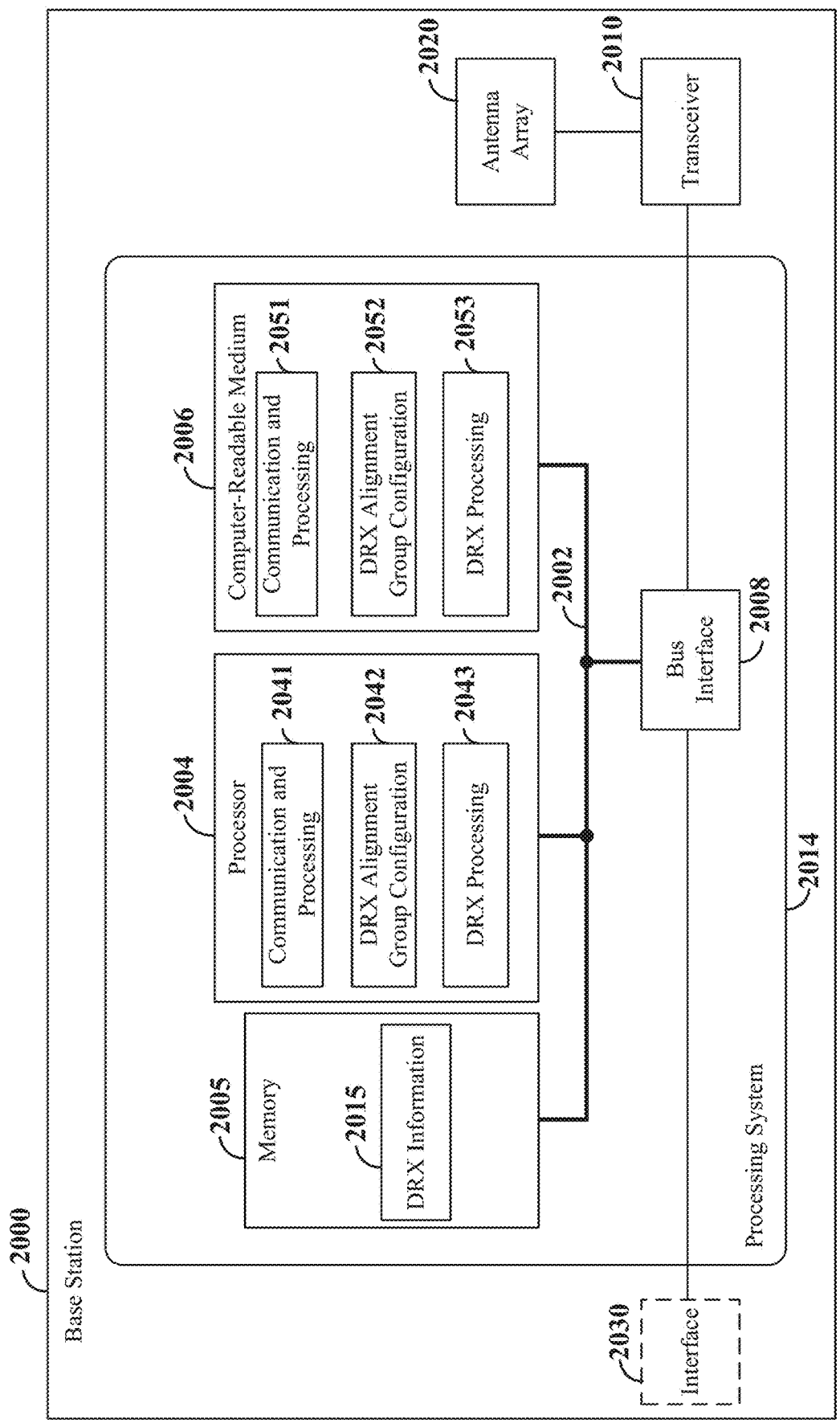
FIG. 20 is a block diagram illustrating an example of a hardware implementation for a base station employing a processing system according to some aspects.

FIG. 20 is a conceptual diagram illustrating an example of a hardware implementation for a base station 2000 employing a processing system 2014. In some implementations, the base station 2000 may correspond to any of the base stations (e.g., gNBs) or scheduling entities as illustrated in any of FIGS. 1, 3, 7, 8, 12, and 15.

In accordance with various aspects of the disclosure, an element, or any portion of an element, or any combination of elements may be implemented with the processing system 2014. The processing system may include one or more processors 2004. The processing system 2014 may be substantially the same as the processing system 1714 illustrated in FIG. 17, including a bus interface 2008, a bus 2002, memory 2005, a processor 2004, a transceiver 2010, an antenna array 2020, and a computer-readable medium 2006. The memory 2005 may store DRX information 2015 used by the processor 2004 in cooperation with the transceiver 2010 for DRX-related communication. Furthermore, the base station 2000 may include an interface 2030 (e.g., a network interface) that provides a means for communicating with at least one other apparatus within a core network and with at least one radio access network.

The base station 2000 may be configured to perform any one or more of the operations described herein (e.g., as described above in conjunction with FIGS. 1-16 and as described below in conjunction with FIGS. 21-22). In some aspects of the disclosure, the processor 2004, as utilized in the base station 2000, may include circuitry configured for various functions.

The processor 2004 may be configured to generate, schedule, and modify a resource assignment or grant of time-frequency resources (e.g., a set of one or more resource elements). For example, the processor 2004 may schedule time-frequency resources within a plurality of time division duplex (TDD) and/or frequency division duplex (FDD) subframes, slots, and/or mini-slots to carry user data traffic and/or control information to and/or from multiple UEs.

The processor 2004 may be configured to schedule resources for the transmission of sidelink signals, downlink signals, or uplink signals. The processor 2004 may be configured to schedule resources for measurement operations.

In some aspects of the disclosure, the processor 2004 may include communication and processing circuitry 2041. The communication and processing circuitry 2044 may be configured to communicate with a UE. The communication and processing circuitry 2041 may include one or more hardware components that provide the physical structure that performs various processes related to communication (e.g., signal reception and/or signal transmission) as described herein. The communication and processing circuitry 2041 may further include one or more hardware components that provide the physical structure that performs various processes related to signal processing (e.g., processing a received signal and/or processing a signal for transmission) as described herein. The communication and processing circuitry 2041 may further be configured to execute communication and processing software 2051 included on the computer-readable medium 2006 to implement one or more functions described herein.

The communication and processing circuitry 2041 may further be configured to receive an indication from the UE. For example, the indication may be included in a MAC-CE carried in a Uu PUSCH or a PSCCH, or included in a Uu RRC message or a sidelink RRC message, or included in a dedicated Uu PUCCH or PUSCH. The communication and processing circuitry 2041 may further be configured to receive a scheduling request from a UE for an uplink grant or a sidelink grant.

In some implementations wherein the communication involves receiving information, the communication and processing circuitry 2041 may obtain information from a component of the base station 2000 (e.g., from the transceiver 2010 that receives the information via radio frequency signaling or some other type of signaling suitable for the applicable communication medium), process (e.g., decode) the information, and output the processed information. For example, the communication and processing circuitry 2041 may output the information to another component of the processor 2004, to the memory 2005, or to the bus interface 2008. In some examples, the communication and processing circuitry 2041 may receive one or more of signals, messages, other information, or any combination thereof. In some examples, the communication and processing circuitry 2041 may receive information via one or more channels. In some examples, the communication and processing circuitry 2041 may include functionality for a means for receiving. In some examples, the communication and processing circuitry 2041 may include functionality for a means for decoding.

In some implementations wherein the communication involves sending (e.g., transmitting) information, the communication and processing circuitry 2041 may obtain information (e.g., from another component of the processor 2004, the memory 2005, or the bus interface 2008), process (e.g., encode) the information, and output the processed information. For example, the communication and processing circuitry 2041 may output the information to the transceiver 2010 (e.g., that transmits the information via radio frequency signaling or some other type of signaling suitable for the applicable communication medium). In some examples, the communication and processing circuitry 2041 may send one or more of signals, messages, other information, or any combination thereof. In some examples, the communication and processing circuitry 2041 may send information via one or more channels. In some examples, the communication and processing circuitry 2041 may include functionality for a means for sending (e.g., a means for transmitting). In some examples, the communication and processing circuitry 2041 may include functionality for a means for encoding.

The processor 2004 may include DRX alignment group configuration circuitry 2042 configured to perform DRX alignment group configuration-related operations as discussed herein (e.g., one or more of the operations described in conjunction with FIGS. 7-16). The DRX alignment group configuration circuitry 2042 may be configured to execute DRX alignment group configuration software 2052 included on the computer-readable medium 2006 to implement one or more functions described herein.

The DRX alignment group configuration circuitry 2042 may include functionality for a means for transmitting an indication of at least one discontinuous reception alignment group. For example, the DRX alignment group configuration circuitry 2042 may be configured to generate a DRX configuration or obtain a DRX configuration (e.g., from a memory device or a wireless communication device) and formulate a message (e.g., an RRC message, a MAC-CE, etc.) that includes the DRX configuration. In some examples, the DRX alignment group configuration circuitry 2042 may generate or otherwise obtain a DRX configuration that specifies alignment of Uu DRX for a first user equipment and SL DRX for a second user equipment of a DRX alignment group. In some examples, the DRX alignment group configuration circuitry 2042 may generate or otherwise obtain a DRX configuration that specifies alignment of Uu DRX for the first user equipment and SL DRX for the first user equipment. In some examples, the DRX alignment group configuration circuitry 2042 may generate or otherwise obtain a DRX configuration that specifies alignment of SL DRX for the first user equipment and Uu DRX for the second user equipment. In some examples, the DRX alignment group configuration circuitry 2042 may generate or otherwise obtain a DRX configuration that specifies alignment of Uu DRX for the second user equipment and SL DRX for the second user equipment.

In addition, the DRX alignment group configuration circuitry 2042 may be configured to cooperate with the communication and processing circuitry 2041 to transmit the message to a wireless communication device (e.g., a UE or a base station) via an allocated channel (e.g., a PSSCH or a PDSCH). In some examples, the DRX alignment group configuration circuitry 2042 may be configured to select an index (e.g., included in the message) that identifies a particular DRX configuration from a set (e.g., a table) of DRX configurations maintained by the base station 2000 and include that index in the message.

The processor 2004 may include DRX processing circuitry 2043 configured to perform DRX processing-related operations as discussed herein (e.g., one or more of the operations described in conjunction with FIGS. 7-16). The DRX processing circuitry 2043 may be configured to execute DRX processing software 2053 included on the computer-readable medium 2006 to implement one or more functions described herein.

The DRX processing circuitry 2043 may include functionality for a means for transmitting a data transmission according to a DRX group. For example, the DRX processing circuitry 2043 may be configured to transmit the data transmission at intervals specified by a DRX configuration for the DRX alignment group via an allocated channel (e.g., a PSSCH or a PDSCH).

Figure 21:
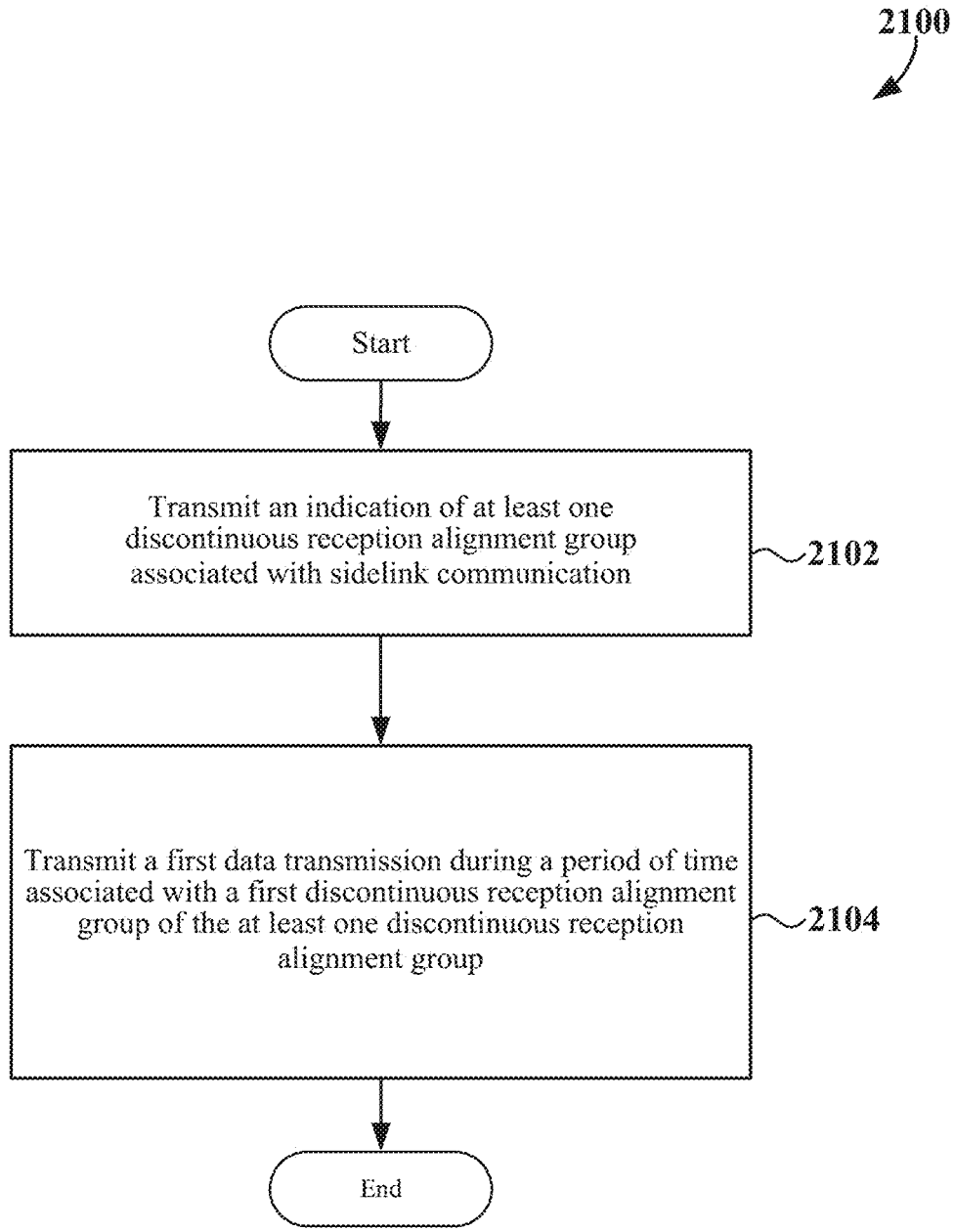
FIG. 21 is a flow chart of an example method that involves transmitting an indication of at least one DRX alignment group according to some aspects.

FIG. 21 is a flow chart of a method 2100 for wireless communication according to some aspects. As described below, some or all illustrated features may be omitted in a particular implementation within the scope of the present disclosure, and some illustrated features may not be required for implementation of all examples. In some examples, the method 2100 may be performed by the base station 2000 (e.g., performed by the processing system 2014), as described above and illustrated in FIG. 20, by a processor or processing system, or by any suitable means for carrying out the described functions.

At block 2102, a base station may transmit an indication of at least one discontinuous reception alignment group associated with sidelink communication. For example, the DRX alignment group configuration circuitry 2042 together with the communication and processing circuitry 2041 and the transceiver 2010, shown and described above in connection with FIG. 20, may provide a means to transmit an indication of at least one discontinuous reception alignment group associated with sidelink communication.

At block 2104, a base station may transmit a first data transmission during a period of time associated with a first discontinuous reception alignment group of the at least one discontinuous reception alignment group. For example, the DRX processing circuitry 2043 together with the communication and processing circuitry 2041 and the transceiver 2010, shown and described above in connection with FIG. 20, may provide a means to transmit a first data transmission during a period of time associated with a first discontinuous reception alignment group of the at least one discontinuous reception alignment group.

In some examples, the first discontinuous reception alignment group is associated with at least one of a first alignment of Uu discontinuous reception for the first user equipment and sidelink discontinuous reception for a second user equipment of the first discontinuous reception alignment group, a second alignment of Uu discontinuous reception for the first user equipment and sidelink discontinuous reception for the first user equipment, a third alignment of sidelink discontinuous reception for the first user equipment and Uu discontinuous reception for the second user equipment, or a fourth alignment of Uu discontinuous reception for the second user equipment and sidelink discontinuous reception for the second user equipment.

In some examples, the indication of the at least one discontinuous reception alignment group specifies that a user equipment is to use the first discontinuous reception alignment group. In some examples, the indication of the at least one discontinuous reception alignment group may include a first discontinuous reception configuration. In some examples, the first discontinuous reception alignment group configuration may include at least one of an indication of how many discontinuous reception alignment groups have been defined, a start time for each discontinuous reception alignment group of the plurality of discontinuous reception alignment groups, a time offset for each discontinuous reception alignment group of the plurality of discontinuous reception alignment groups, a time duration for each discontinuous reception alignment group of the plurality of discontinuous reception alignment groups, an identifier of each user equipment assigned to each discontinuous reception alignment group of the plurality of discontinuous reception alignment groups, or a combination thereof. In some examples, the first discontinuous reception configuration is different from a second discontinuous reception configuration associated with a second discontinuous reception alignment group of the at least one discontinuous reception alignment group. In some examples, the period of time associated with the first discontinuous reception alignment group does not overlap a period of time associated with a second discontinuous reception alignment group of the at least one discontinuous reception alignment group. In some examples, the period of time associated with the first discontinuous reception alignment group partially overlaps the period of time associated with the second discontinuous reception alignment group.

In some examples, the first base station may receive an indication from a second base station that the first discontinuous reception alignment group is designated for a user equipment. In some examples, the first base station may request a discontinuous reception alignment group configuration from the second base station.

In some examples, the first base station may select the first discontinuous reception alignment group for a user equipment. In some examples, the first base station may select the first discontinuous reception alignment group for a user equipment based on at least one of a sidelink connection of the user equipment, a resource allocation mode used by the user equipment, a sidelink mode used by the user equipment, a quality of service requirement associated with the user equipment, a quantity of user equipments assigned to the first discontinuous reception alignment group, a traffic load associated with the first discontinuous reception alignment group, power consumption of the user equipment, a priority associated with the user equipment, a priority of the first discontinuous reception group, or a combination thereof.

In some examples, the at least one discontinuous reception alignment group comprises a plurality of discontinuous reception alignment groups. In some examples, the first base station may identify the first discontinuous reception alignment group based on an identifier of a user equipment.

In some examples, the first base station may define the plurality of discontinuous reception alignment groups. In some examples, the first base station may allocate different user equipments to different ones of the plurality of discontinuous reception alignment groups. In some examples, the first base station may allocate the different user equipments to different ones of the plurality of discontinuous reception alignment groups based on a quantity of user equipments served by the first base station.

Figure 22:
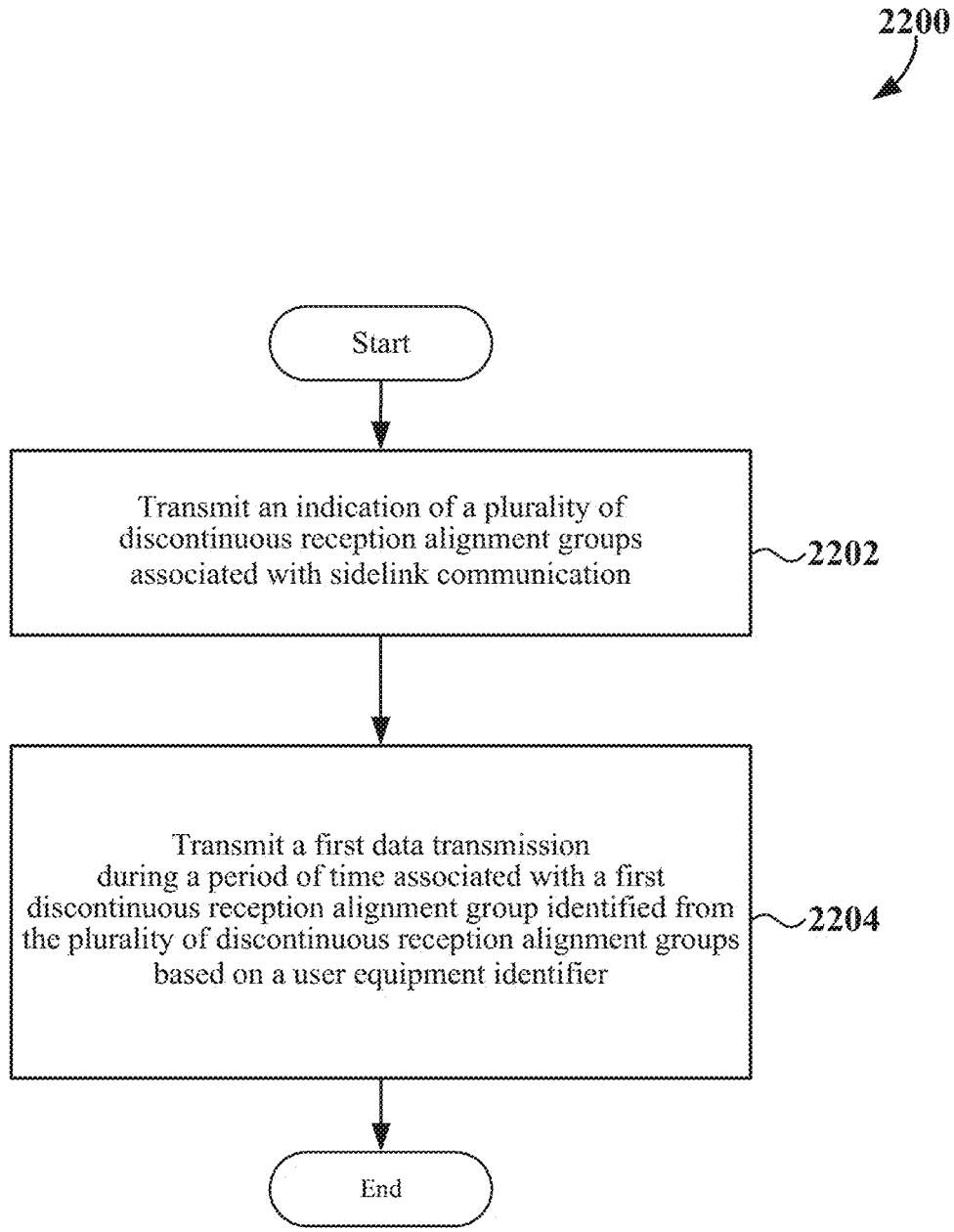
FIG. 22 is a flow chart of an example method that involves transmitting an indication of a plurality of DRX alignment groups according to some aspects.

FIG. 22 is a flow chart of a method 2200 for wireless communication according to some aspects. As described below, some or all illustrated features may be omitted in a particular implementation within the scope of the present disclosure, and some illustrated features may not be required for implementation of all examples. In some examples, the method 2200 may be performed by the base station 2000 (e.g., performed by the processing system 2014), as described above and illustrated in FIG. 20, by a processor or processing system, or by any suitable means for carrying out the described functions.

At block 2202, a base station may transmit an indication of a plurality of discontinuous reception alignment groups associated with sidelink communication. For example, the DRX alignment group configuration circuitry 2042 together with the communication and processing circuitry 2041 and the transceiver 2010, shown and described above in connection with FIG. 20, may provide a means to transmit an indication of a plurality of discontinuous reception alignment groups associated with sidelink communication.

At block 2204, a base station may transmit a first data transmission during a period of time associated with a first discontinuous reception alignment group identified from the plurality of discontinuous reception alignment groups based on a user equipment identifier. For example, the DRX alignment group configuration circuitry 2042 together with the communication and processing circuitry 2041 and the transceiver 2010, shown and described above in connection with FIG. 20, may provide a means to transmit a first data transmission during a period of time associated with a first discontinuous reception alignment group identified from the plurality of discontinuous reception alignment groups based on a user equipment identifier.

In some examples, the first discontinuous reception alignment group is associated with at least one of a first alignment of Uu discontinuous reception for the first user equipment and sidelink discontinuous reception for a second user equipment of the first discontinuous reception alignment group, a second alignment of Uu discontinuous reception for the first user equipment and sidelink discontinuous reception for the first user equipment, a third alignment of sidelink discontinuous reception for the first user equipment and Uu discontinuous reception for the second user equipment, or a fourth alignment of Uu discontinuous reception for the second user equipment and sidelink discontinuous reception for the second user equipment.

In some examples, the indication of the plurality of discontinuous reception alignment groups specifies that a user equipment is to use the first discontinuous reception alignment group. In some examples, the first discontinuous reception alignment group configuration may include at least one of an indication of how many discontinuous reception alignment groups have been defined, a start time for each discontinuous reception alignment group of the plurality of discontinuous reception alignment groups, a time offset for each discontinuous reception alignment group of the plurality of discontinuous reception alignment groups, a time duration for each discontinuous reception alignment group of the plurality of discontinuous reception alignment groups, an identifier of each user equipment assigned to each discontinuous reception alignment group of the plurality of discontinuous reception alignment groups, or a combination thereof. In some examples, the first discontinuous reception configuration is different from a second discontinuous reception configuration associated with a second discontinuous reception alignment group of the plurality of discontinuous reception alignment groups. In some examples, the period of time associated with the first discontinuous reception alignment group does not overlap a period of time associated with a second discontinuous reception alignment group of the plurality of discontinuous reception alignment groups. In some examples, the period of time associated with the first discontinuous reception alignment group partially overlaps the period of time associated with the second discontinuous reception alignment group.

In some examples, the first base station may receive an indication from a second base station that the first discontinuous reception alignment group is designated for a user equipment. In some examples, the first base station may request a discontinuous reception alignment group configuration from the second base station.

In some examples, the first base station may select the first discontinuous reception alignment group for a user equipment. In some examples, the first base station may select the first discontinuous reception alignment group for a user equipment based on at least one of a sidelink connection of the user equipment, a resource allocation mode used by the user equipment, a sidelink mode used by the user equipment, a quality of service requirement associated with the user equipment, a quantity of user equipments assigned to the first discontinuous reception alignment group, a traffic load associated with the first discontinuous reception alignment group, power consumption of the user equipment, a priority associated with the user equipment, a priority of the first discontinuous reception group, or a combination thereof.

In some examples, the first base station may identify the first discontinuous reception alignment group based on an identifier of a user equipment.

In some examples, the first base station may define the plurality of discontinuous reception alignment groups. In some examples, the first base station may allocate different user equipments to different ones of the plurality of discontinuous reception alignment groups. In some examples, the first base station may allocate the different user equipments to different ones of the plurality of discontinuous reception alignment groups based on a quantity of user equipment served by the first base station.

In one configuration, the base station 2000 includes means for transmitting an indication of at least one discontinuous reception alignment group associated with sidelink communication, and means for transmitting a first data transmission during a period of time associated with a first discontinuous reception alignment group of the at least one discontinuous reception alignment group. In one aspect, the aforementioned means may be the processor 2004 shown in FIG. 20 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable medium 2006, or any other suitable apparatus or means described in any one or more of FIGS. 1, 3, 7, 11, and 20 and utilizing, for example, the methods and/or algorithms described herein in relation to FIGS. 21-22.

The methods shown in FIGS. 18-19 and 21-22 may include additional aspects, such as any single aspect or any combination of aspects described below and/or in connection with one or more other processes described elsewhere herein. The following provides an overview of several aspects of the present disclosure.

Aspect 1: A method for wireless communication at a first user equipment, the method comprising: receiving an indication of at least one discontinuous reception alignment group associated with sidelink communication; and receiving a first data transmission during a period of time associated with a first discontinuous reception alignment group of the at least one discontinuous reception alignment group.

Aspect 2: The method of aspect 1, wherein the first discontinuous reception alignment group is associated with at least one of: a first alignment of Uu discontinuous reception for the first user equipment and sidelink discontinuous reception for a second user equipment of the first discontinuous reception alignment group; a second alignment of Uu discontinuous reception for the first user equipment and sidelink discontinuous reception for the first user equipment; a third alignment of sidelink discontinuous reception for the first user equipment and Uu discontinuous reception for the second user equipment; or a fourth alignment of Uu discontinuous reception for the second user equipment and sidelink discontinuous reception for the second user equipment.

Aspect 3: The method of aspect 1 or 2, wherein the at least one discontinuous reception alignment group is the first discontinuous reception alignment group.

Aspect 4: The method of any of aspects 1 through 3, wherein: the at least one discontinuous reception alignment group comprises a plurality of discontinuous reception alignment groups; and the method further comprises identifying the first discontinuous reception alignment group based on an identifier of the first user equipment.

Aspect 5: The method of aspect 4, wherein a first discontinuous reception configuration associated with the first discontinuous reception alignment group is different from a second discontinuous reception configuration associated with a second discontinuous reception alignment group of the plurality of discontinuous reception alignment groups.

Aspect 6: The method of aspect 4, wherein the first discontinuous reception alignment group configuration comprises at least one of: an indication of how many discontinuous reception alignment groups have been defined, a start time for each discontinuous reception alignment group of the plurality of discontinuous reception alignment groups, a time offset for each discontinuous reception alignment group of the plurality of discontinuous reception alignment groups, a time duration for each discontinuous reception alignment group of the plurality of discontinuous reception alignment groups, an identifier of each user equipment assigned to each discontinuous reception alignment group of the plurality of discontinuous reception alignment groups, or a combination thereof.

Aspect 7: The method of any of aspects 1 through 6, further comprising: transmitting the indication of the at least one discontinuous reception alignment group to a second user equipment via a sidelink channel.

Aspect 8: The method of any of aspects 1 through 7, further comprising: transmitting an indication of the first discontinuous reception alignment group to a second user equipment via a sidelink channel.

Aspect 9: The method of any of aspects 1 through 8, further comprising: transmitting the indication of the at least one discontinuous reception alignment group to a base station that serves the first user equipment; or transmitting an indication of the first discontinuous reception alignment group to the base station that serves the first user equipment.

Aspect 10: The method of any of aspects 1 through 9, further comprising: extending a first sidelink discontinuous reception duration to communicate with a second user equipment that is assigned to a second discontinuous reception alignment group that is different from the first discontinuous reception alignment group.

Aspect 11: The method of aspect 10, wherein: the first sidelink discontinuous reception duration is associated with a PC5 link; or the first sidelink discontinuous reception duration is associated with a Uu link.

Aspect 12: The method of any of aspects 1 through 11, wherein a first discontinuous reception configuration associated with the first discontinuous reception alignment group is different from a second discontinuous reception configuration associated with a second discontinuous reception alignment group of the at least one discontinuous reception alignment group.

Aspect 13: The method of any of aspects 1 through 12, wherein the period of time associated with the first discontinuous reception alignment group does not overlap a period of time associated with a second discontinuous reception alignment group of the at least one discontinuous reception alignment group.

Aspect 14: The method of any of aspects 1 through 12, wherein the period of time associated with the first discontinuous reception alignment group partially overlaps a period of time associated with a second discontinuous reception alignment group of the at least one discontinuous reception alignment group.

Aspect 16: A method for wireless communication at a first base station, the method comprising: transmitting an indication of at least one discontinuous reception alignment group associated with sidelink communication; and transmitting a first data transmission during a period of time associated with a first discontinuous reception alignment group of the at least one discontinuous reception alignment group.

Aspect 17: The method of aspect 16, wherein the indication of the at least one discontinuous reception alignment group specifies that a user equipment is to use the first discontinuous reception alignment group.

Aspect 18: The method of any of aspects 16 through 17, wherein the indication of the at least one discontinuous reception alignment group comprises a first discontinuous reception configuration.

Aspect 19: The method of aspect 18, wherein the first discontinuous reception alignment group configuration comprises at least one of: an indication of how many discontinuous reception alignment groups have been defined, a start time for each discontinuous reception alignment group of a plurality of discontinuous reception alignment groups, a time offset for each discontinuous reception alignment group of the plurality of discontinuous reception alignment groups, a time duration for each discontinuous reception alignment group of the plurality of discontinuous reception alignment groups, an identifier of each user equipment assigned to each discontinuous reception alignment group of the plurality of discontinuous reception alignment groups, or a combination thereof.

Aspect 20: The method of any of aspects 18 through 19, wherein the first discontinuous reception configuration is different from a second discontinuous reception configuration associated with a second discontinuous reception alignment group of the at least one discontinuous reception alignment group.

Aspect 21: The method of any of aspects 18 through 20, wherein: the period of time associated with the first discontinuous reception alignment group does not overlap a period of time associated with a second discontinuous reception alignment group of the at least one discontinuous reception alignment group; or the period of time associated with the first discontinuous reception alignment group partially overlaps the period of time associated with the second discontinuous reception alignment group.

Aspect 22: The method of any of aspects 16 through 21, further comprising: receiving an indication from a second base station that the first discontinuous reception alignment group is designated for a user equipment.

Aspect 23: The method of aspect 22, further comprising: requesting a discontinuous reception alignment group configuration from the second base station.

Aspect 24: The method of any of aspects 16 through 23, further comprising: selecting the first discontinuous reception alignment group for a user equipment.

Aspect 25: The method of any of aspects 16 through 24, further comprising: selecting the first discontinuous reception alignment group for a user equipment based on at least one of: a sidelink connection of the user equipment, a resource allocation mode used by the user equipment, a sidelink mode used by the user equipment, a quality of service requirement associated with the user equipment, a quantity of user equipments assigned to the first discontinuous reception alignment group, a traffic load associated with the first discontinuous reception alignment group, power consumption of the user equipment, a priority associated with the user equipment, a priority of the first discontinuous reception group, or a combination thereof.

Aspect 26: The method of any of aspects 16 through 25, wherein the at least one discontinuous reception alignment group comprises a plurality of discontinuous reception alignment groups.

Aspect 27: The method of any aspect 26, further comprising: identifying the first discontinuous reception alignment group based on an identifier of a user equipment.

Aspect 28: The method of any of aspects 26 through 27, further comprising: defining the plurality of discontinuous reception alignment groups; and allocating different user equipments to different ones of the plurality of discontinuous reception alignment groups.

Aspect 29: The method of aspect 28, further comprising: allocating the different user equipments to different ones of the plurality of discontinuous reception alignment groups based on a quantity of user equipment served by the first base station.

Aspect 30: A user equipment comprising: a transceiver configured to communicate with a radio access network, and a processor coupled to the transceiver, wherein the processor is configured to perform any one of aspects 1 through 15.

Aspect 31: An apparatus configured for wireless communication comprising at least one means for performing any one of aspects 1 through 15.

Aspect 32: A non-transitory computer-readable medium storing computer-executable code, comprising code for causing an apparatus to perform any one of aspects 1 through 15.

Aspect 33: A base station comprising: a transceiver, and a processor coupled to the transceiver, wherein the processor is configured to perform any one of aspects 16 through 29.

Aspect 34: An apparatus configured for wireless communication comprising at least one means for performing any one of aspects 16 through 29.

Aspect 35: A non-transitory computer-readable medium storing computer-executable code, comprising code for causing an apparatus to perform any one of aspects 16 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 7, 8, 12, 15, 17, and 20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first user equipment, comprising:
   one or more memories that store processor-executable code; and
   one or more processors configured to execute the processor-executable code and cause the first user equipment to:
      receive an indication of at least one discontinuous reception alignment group associated with sidelink communication, the indication comprising at least one discontinuous reception group identifier associated with the at least one discontinuous reception alignment group;
      transmit the indication of the at least one discontinuous reception alignment group or an indication of a first discontinuous reception alignment group of the at least one discontinuous reception alignment group to a base station that serves the first user equipment; and
      receive a first data transmission during a period of time associated with the first discontinuous reception alignment group of the at least one discontinuous reception alignment group.

2. The first user equipment of claim 1, wherein the first discontinuous reception alignment group is associated with at least one of:
   a first alignment of Uu discontinuous reception for the first user equipment and sidelink discontinuous reception for a second user equipment of the first discontinuous reception alignment group;
   a second alignment of Uu discontinuous reception for the first user equipment and sidelink discontinuous reception for the first user equipment;
   a third alignment of sidelink discontinuous reception for the first user equipment and Uu discontinuous reception for the second user equipment; or
   a fourth alignment of Uu discontinuous reception for the second user equipment and sidelink discontinuous reception for the second user equipment.

3. The first user equipment of claim 1, wherein the at least one discontinuous reception alignment group is the first discontinuous reception alignment group.

4. The first user equipment of claim 1, wherein:
   the at least one discontinuous reception alignment group comprises a plurality of discontinuous reception alignment groups; and
   the one or more processors are further configured to execute the processor-executable code and cause the first user equipment to identify the first discontinuous reception alignment group based on an identifier of the first user equipment.

5. The first user equipment of claim 4, wherein a first discontinuous reception configuration associated with the first discontinuous reception alignment group is different from a second discontinuous reception configuration associated with a second discontinuous reception alignment group of the plurality of discontinuous reception alignment groups.

6. The first user equipment of claim 4, wherein the indication of at least one discontinuous reception alignment group includes a first discontinuous reception alignment group configuration that comprises at least one of: an indication of how many discontinuous reception alignment groups have been defined, a start time for each discontinuous reception alignment group of the plurality of discontinuous reception alignment groups, a time offset for each discontinuous reception alignment group of the plurality of discontinuous reception alignment groups, a time duration for each discontinuous reception alignment group of the plurality of discontinuous reception alignment groups, an identifier of each user equipment assigned to each discontinuous reception alignment group of the plurality of discontinuous reception alignment groups, or a combination thereof.

7. The first user equipment of claim 1, wherein the one or more processors are further configured to execute the processor-executable code and cause the first user equipment to:
transmit the indication of the at least one discontinuous reception alignment group to a second user equipment via a sidelink channel.

8. The first user equipment of claim 1, wherein the one or more processors are further configured to execute the processor-executable code and cause the first user equipment to:
transmit an indication of the first discontinuous reception alignment group to a second user equipment via a sidelink channel.

9. The first user equipment of claim 1, wherein the one or more processors are further configured to execute the processor-executable code and cause the first user equipment to:
extend a first sidelink discontinuous reception duration to communicate with a second user equipment that is assigned to a second discontinuous reception alignment group that is different from the first discontinuous reception alignment group.

10. The first user equipment of claim 9, wherein:
the first sidelink discontinuous reception duration is associated with a PC5 link; or
the first sidelink discontinuous reception duration is associated with a Uu link.

11. The first user equipment of claim 1, wherein a first discontinuous reception configuration associated with the first discontinuous reception alignment group is different from a second discontinuous reception configuration associated with a second discontinuous reception alignment group of the at least one discontinuous reception alignment group.

12. The first user equipment of claim 1, wherein the period of time associated with the first discontinuous reception alignment group does not overlap a period of time associated with a second discontinuous reception alignment group of the at least one discontinuous reception alignment group.

13. The first user equipment of claim 1, wherein the period of time associated with the first discontinuous reception alignment group partially overlaps a period of time associated with a second discontinuous reception alignment group of the at least one discontinuous reception alignment group.

14. A method for wireless communication at a first user equipment, the method comprising:
receiving an indication of at least one discontinuous reception alignment group associated with sidelink communication, the indication comprising at least one discontinuous reception group identifier associated with the at least one discontinuous reception alignment group;
transmit the indication of the at least one discontinuous reception alignment group or an indication of a first discontinuous reception alignment group of the at least one discontinuous reception alignment group to a base station that serves the first user equipment; and
receiving a first data transmission during a period of time associated with the first discontinuous reception alignment group of the at least one discontinuous reception alignment group.

15. A first base station, comprising:
one or more memories that store processor-executable code; and
one or more processors configured to execute the processor-executable code and cause the first base station to:
transmit an indication of at least one discontinuous reception alignment group associated with sidelink communication, the indication comprising at least one discontinuous reception group identifier associated with the at least one discontinuous reception alignment group;
receive an indication of a first discontinuous reception alignment group of the at least one discontinuous reception alignment group; and
transmit a first data transmission during a period of time associated with the first discontinuous reception alignment group of the at least one discontinuous reception alignment group.

16. The first base station of claim 15, wherein the indication of the at least one discontinuous reception alignment group specifies that a user equipment is to use the first discontinuous reception alignment group.

17. The first base station of claim 15, wherein the indication of the at least one discontinuous reception alignment group comprises a first discontinuous reception configuration.

18. The first base station of claim 17, wherein the first discontinuous reception alignment group configuration comprises at least one of: an indication of how many discontinuous reception alignment groups have been defined, a start time for each discontinuous reception alignment group of a plurality of discontinuous reception alignment groups, a time offset for each discontinuous reception alignment group of the plurality of discontinuous reception alignment groups, a time duration for each discontinuous reception alignment group of the plurality of discontinuous reception alignment groups, an identifier of each user equipment assigned to each discontinuous reception alignment group of the plurality of discontinuous reception alignment groups, or a combination thereof.

19. The first base station of claim 17, wherein the first discontinuous reception configuration is different from a second discontinuous reception configuration associated with a second discontinuous reception alignment group of the at least one discontinuous reception alignment group.

20. The first base station of claim 17, wherein:
the period of time associated with the first discontinuous reception alignment group does not overlap a period of time associated with a second discontinuous reception alignment group of the at least one discontinuous reception alignment group; or
the period of time associated with the first discontinuous reception alignment group partially overlaps the period of time associated with the second discontinuous reception alignment group.

21. The first base station of claim 15, wherein the one or more processors are further configured to execute the processor-executable code and cause the first base station to receive an indication from a second base station that the first discontinuous reception alignment group is designated for a user equipment.

22. The first base station of claim 21, wherein the one or more processors are further configured to execute the processor-executable code and cause the first base station to request a discontinuous reception alignment group configuration from the second base station.

23. The first base station of claim 15, wherein the one or more processors are further configured to execute the processor-executable code and cause the first base station to select the first discontinuous reception alignment group for a user equipment.

24. The first base station of claim 15, wherein the further configured one or more processors are further configured to execute the processor-executable code and cause the first base station to select the first discontinuous reception alignment group for a user equipment based on at least one of: a sidelink connection of the user equipment, a resource allocation mode used by the user equipment, a sidelink mode used by the user equipment, a quality of service requirement associated with the user equipment, a quantity of user equipments assigned to the first discontinuous reception alignment group, a traffic load associated with the first discontinuous reception alignment group, power consumption of the user equipment, a priority associated with the user equipment, a priority of the first discontinuous reception group, or a combination thereof.

25. The first base station of claim 15, wherein the at least one discontinuous reception alignment group comprises a plurality of discontinuous reception alignment groups.

26. The first base station of claim 25, wherein the one or more processors are further configured to execute the processor-executable code and cause the first base station to identify the first discontinuous reception alignment group based on an identifier of a user equipment.

27. The first base station of claim 25, wherein the one or more processors are further configured to execute the processor-executable code and cause the first base station to:
define the plurality of discontinuous reception alignment groups; and
allocate different user equipments to different ones of the plurality of discontinuous reception alignment groups.

28. The first base station of claim 27, wherein the one or more processors are further configured to execute the processor-executable code and cause the first base station to allocate the different user equipments to different ones of the plurality of discontinuous reception alignment groups based on a quantity of user equipment served by the first base station.

29. A method for wireless communication at a first base station, the method comprising:
transmitting an indication of at least one discontinuous reception alignment group associated with sidelink communication, the indication comprising at least one discontinuous reception group identifier associated with the at least one discontinuous reception alignment group;
receiving an indication of a first discontinuous reception alignment group of the at least one discontinuous reception alignment group; and
transmitting a first data transmission during a period of time associated with the first discontinuous reception alignment group of the at least one discontinuous reception alignment group.

* * * * *